US 8,533,489 B2

(12) United States Patent
Roeder et al.

(10) Patent No.: US 8,533,489 B2
(45) Date of Patent: Sep. 10, 2013

(54) SEARCHABLE SYMMETRIC ENCRYPTION WITH DYNAMIC UPDATING

(75) Inventors: Thomas M. Roeder, Redmond, WA (US); Seny F. Kamara, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 329 days.

(21) Appl. No.: 12/892,943

(22) Filed: Sep. 29, 2010

(65) Prior Publication Data

US 2012/0078914 A1 Mar. 29, 2012

(51) Int. Cl.
*H04L 29/06* (2006.01)
*G06F 21/00* (2006.01)

(52) U.S. Cl.
USPC ........... 713/189; 713/165; 713/166; 713/167; 713/193; 726/26; 726/27; 380/255; 380/259; 380/277; 380/278; 380/44; 380/45; 380/46; 380/47; 380/28; 380/30; 707/673; 707/696; 707/705; 707/711; 707/741; 707/742; 707/743; 707/744; 707/745; 707/746; 707/747

(58) Field of Classification Search
USPC ............... 713/164–167, 187; 726/26–30; 380/255–264, 277–30; 707/673, 696–699, 707/705–711, 741–747, 790–800, 830
See application file for complete search history.

(56) References Cited

U.S. PATENT DOCUMENTS

| | | | | |
|---|---|---|---|---|
| 5,687,397 | A * | 11/1997 | Ohmori | 710/73 |
| 5,963,642 | A * | 10/1999 | Goldstein | 713/193 |
| 7,418,098 | B1 * | 8/2008 | Mattsson et al. | 380/28 |
| 7,512,814 | B2 | 3/2009 | Chen et al. | |
| 7,689,547 | B2 * | 3/2010 | Cristofor et al. | 707/715 |
| 2005/0004924 | A1 * | 1/2005 | Baldwin | 707/100 |
| 2006/0041533 | A1 * | 2/2006 | Koyfman | 707/3 |
| 2007/0294235 | A1 * | 12/2007 | Millett | 707/3 |
| 2008/0133935 | A1 * | 6/2008 | Elovici et al. | 713/193 |
| 2009/0300351 | A1 | 12/2009 | Lei et al. | |
| 2010/0121856 | A1 * | 5/2010 | Lei et al. | 707/747 |
| 2010/0146299 | A1 * | 6/2010 | Swaminathan et al. | 713/189 |
| 2010/0306221 | A1 * | 12/2010 | Lokam et al. | 707/759 |

OTHER PUBLICATIONS

Handbook of Applied Cryptography by Menezes et al; Publisher: CRC Press; Year: 1996.*
Designing Secure Indexes for Encrypted Databases by Shmueli etal; Publisher: Springer; Year: 2005.*
Abdalla, et al., "Searchable Encryption Revisited: Consistency Properties, Relation to Anonymous IBE, and Extensions," retrieved at <<http://www.cs.washington.edu/homes/yoshi/papers/PEKS/PEKS.pdf>>, 2005, 43 pages.

(Continued)

*Primary Examiner* — Madhuri Herzog

(57) ABSTRACT

A Searchable Symmetric Encryption (SSE) mechanism is described which allows efficient dynamic updating of encrypted index information. The encrypted index information includes pointer information that is encrypted using a malleable encryption scheme. The SSE mechanism updates the encrypted index information by modifying at least one instance of the pointer information without decrypting the pointer information, and thereby without revealing the nature of the changes being made. In one implementation, the SSE mechanism includes a main indexing structure and a deletion indexing structure. An updating operation involves patching applied to both the main indexing structure and deletion indexing structure.

20 Claims, 17 Drawing Sheets

(56) References Cited

OTHER PUBLICATIONS

Park, et al., "Efficient Keyword Index Search over Encrypted Documents of Groups," retrieved at <<http://ieeexplore.ieee.org/stamp/stamp.jsp?arnumber=04565063>>, IEEE International Conference on Intelligence and Security Informatics, 2008, pp. 225-229.

Nasrullah, Ilyaz, "Hierarchical Query Mechanisms for Searchable Encrypted Databases," retrieved at <<http://repository.tudelft.nl/view/ir/uuid%3A2b736629-4e3c-40f2-b64d-c65e79847cb9/ >>, Master's Thesis, Delft University of Technology, Jun. 30, 2009, 56 pages.

Sedghi, et al., "Towards an Information Theoretic Analysis of Searchable Encryption (Extended Version)," retrieved at <<http://eprints.eemcs.utwente.nl/13176/01/Paper_Technical_Report.pdf>>, Technical Report TR-CTIT-08-50, Centre for Telematics and Information Technology, University of Twente, 2008, 19 pages.

Park, et al., "Searchable Keyword-Based Encryption," retrieved at <<http://eprint.iacr.org/2005/367.pdf>>, Cryptology ePrint Archive: Report 2005/367, 2005, 13 pages.

Ballard, et al., "Correlation-Resistant Storage via Keyword-Searchable Encryption," retrieved at <<http://spar.isi.jhu.edu/~mgreen/correlation.pdf>>, Cryptology ePrint Archive: Report 2005/417, 2005, 16 pages.

Sedghi, et al., "Adaptively Secure Computationally Efficient Searchable Symmetric Encryption," retrieved at <<http://eprints.eemcs.utwente.nl/15312101/ESORICS09.pdf>>, Technical Report TR-CTIT-09-13, Centre for Telematics and Information Technology, University of Twente, 2009, 17 pages.

Curtmola, et al., "Searchable Symmetric Encryption: Improved Definitions and Efficient Constructions," retrieved at <<http://research.microsoft.com/pubs/102088/sse.pdf>>, Proceedings of the 13th ACM conference on Computer and Communications Security, 2006, pp. 79-88.

\* cited by examiner

SEARCHABLE SYMMETRIC ENCRYPTION WITH DYNAMIC UPDATING

BACKGROUND

Many users store various types of documents in a remote repository (commonly known as "cloud storage"), administered by an external entity. As the term is generally used herein, a document can correspond to any unit of information, such as a text-bearing document, a music file, a picture, a financial record, and so on. A user may opt to store documents in the remote repository for various reasons, e.g., based on factors pertaining to convenience, accessibility, storage capacity, reliability, etc.

Contractual obligations may require the entity which administers the remote repository to minimize the risk of unauthorized access to a user's documents. However, from a technical perspective, there may be little which prevents the entity itself from accessing and examining a user's personal documents. This may understandably unsettle a user. For instance, the user's documents may contain sensitive information that the user does not wish to divulge to any person, including the entity which administers the remote repository.

A user may address this concern by encrypting the documents and storing the documents in encrypted form at the remote repository. This approach effectively prevents the entity which administers the remote repository (or anyone else) from examining the documents. However, this approach also prevents the user from performing any meaningful operations on the documents that are stored in the remote repository. For instance, the encryption of the documents precludes the user from performing an on-line search of the documents. The user may address this situation by downloading all the documents and decrypting them. But this solution runs counter to the user's initial motivation for storing the documents in the remote repository.

To address this situation, the cryptographic community has developed a technique that is commonly referred to as Searchable Symmetric Encryption (SSE). One such SSE technique is described in Curtmola, et al., "Searchable Symmetric Encryption. Improved Definitions and Efficient Constructions," *Proceedings of the* 13*th ACM Conference on Computer and Communications Security,* 2006, pp. 79-88. Another SSE technique is described in Sedghi, et al., "Adaptively Secure Computationally Efficient Searchable Symmetric Encryption," Internal Report, Centre for Telematics and Information Technology, University of Twente, 2009. Curtmola's approach, for example, operates by storing an encrypted index together with the encrypted documents at a remote repository. The user then generates and submits a search token which is deterministically derived from a search term, but which conceals the search term. The remote repository then uses the encrypted index to identify and return a list of document identifiers that are associated with the search term. In this approach, the remote repository does not learn the identity of the search term associated with the search token. Nor does the remote repository learn the identity of the documents conveyed in the search results.

However, there is room for improvement in existing SSE techniques. For example, existing SSE techniques do not provide suitably efficient mechanisms for updating a corpus of documents (and associated index information) stored in the remote repository. The user may make changes to a local copy of the index and then send a complete updated index to the remote repository. However, this solution is burdensome and bandwidth-intensive, and again runs counter to the initial motivation for managing documents at a remote location.

SUMMARY

A searchable symmetric encryption (SSE) mechanism is described herein which allows efficient updating of encrypted index information. The SSE mechanism performs this task by modifying at least one instance of pointer information that has been encrypted using a malleable encryption scheme, without decrypting the pointer information. For example, the pointer information can be encrypted using an exclusive- or (XOR) encryption scheme. The SSE mechanism can modify at least one instance of this XOR-encrypted pointer information using another exclusive- or (XOR) operation. The XOR operation acts to modify the pointer information without removing a mask applied to the pointer information. Hence, a user can apply this technique to update a remote repository without revealing meaningful information regarding the nature of the changes that are being made.

According to one illustrative implementation, the encrypted index information may include a main indexing structure and a deletion indexing structure. The main indexing structure includes a set of main list entries that provides information about lists of documents which contain respective words. The deletion indexing structure provides linking information regarding previous and next entries for each main list entry in the main indexing structure.

According to one illustrative implementation, the SSE mechanism allows individual words to be added to or deleted from the encrypted index information for an identified document. That is, this operation can be used to update the encrypted index information to associate new words with an identified document, or to remove a prior such association. In another scenario, the SSE mechanism allows a group of words for an entire document to be added to or deleted from the encrypted index information. That is, this operation can be used to update the encrypted index information to account for the addition or deletion of an entire document to an existing collection of documents.

According to one illustrative implementation, the SSE mechanism includes addition modules for handling an addition operation (in which a word or a document-associated group of words is added to the encrypted index information). The SSE mechanism also includes deletion modules for handling a deletion operation (in which a word or a document-associated group of words is deleted from the encrypted index information). These modules carry out appropriate patching of both the main indexing structure and the deletion indexing structure to account for addition and/or deletion of words and/or document-associated groups of words.

According to one illustrative implementation, the SSE mechanism includes free list management modules. These modules modify a pool of free list entries to account for the addition and/or deletion of words and/or groups of words. Namely, the SSE mechanism consumes free list entries for an addition operation and relinquishes main list entries to the pool of free list entries for a deletion operation. The free list management modules can also extend the existing pool of free list entries.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an overview of a Searchable Symmetric Encryption (SSE) mechanism that allows efficient updating of encrypted index information. Section B describes a first implementation of the SSE mechanism, which allows adding or deleting of words to/from the encrypted index information for identified documents. Section C describes a second implementation of the SSE mechanism, which allows adding or deleting of groups of words to/from the encrypted index information, where the groups of words respectively correspond to documents that are being added to and removed from a collection of documents. Section D describes illustrative processing functionality that can be used to implement any aspect of the features described in Sections A-C.

Figure 18:
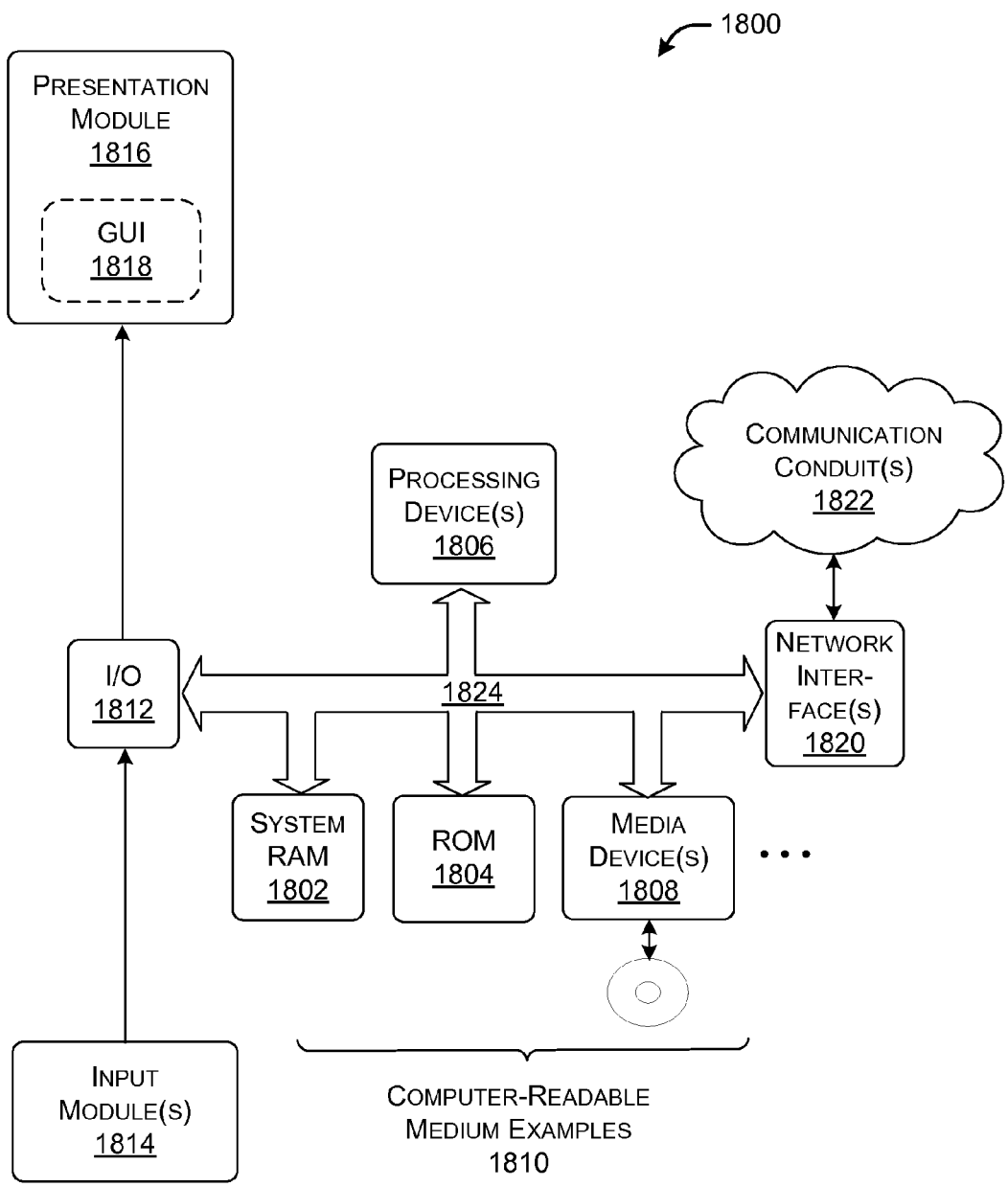
FIG. 18 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 18, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Overview of a SSE Mechanism that Uses Dynamic Updating

Figure 1:
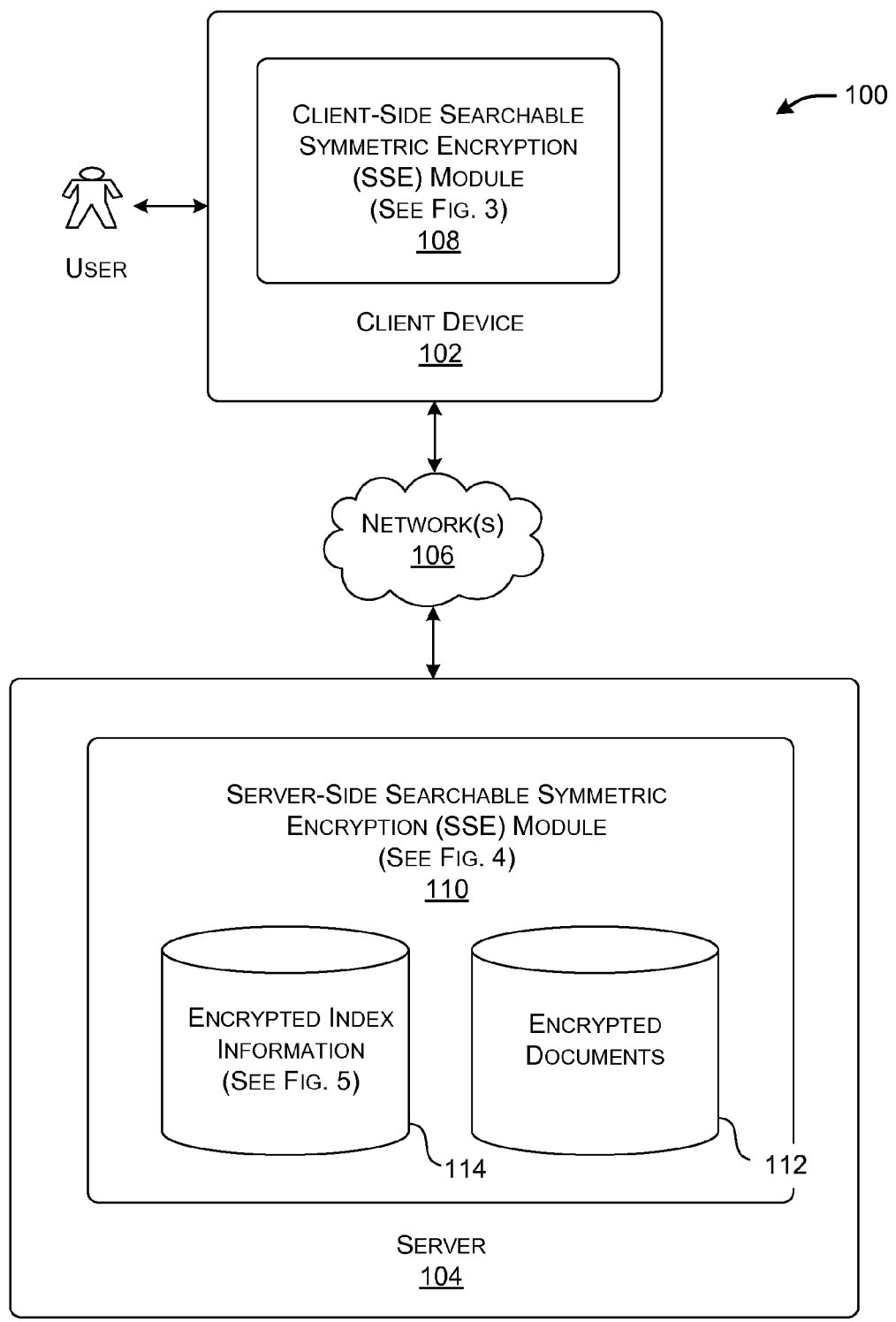
FIG. 1 shows illustrative Searchable Symmetric Encryption (SSE) mechanism, including a client-side SSE module provided at a client device and a server-side SSE module provided at a remote server.

FIG. 1 shows a system 100 that hosts a Searchable Symmetric Encryption (SSE) mechanism. The system 100 includes a client device 102 coupled to a server 104 via a network 106. The client device 102 can be implemented using any type of computer processing functionality. For instance, the client device 102 can be implemented using any one of a personal computer device, a workstation device, a laptop computer device, a personal digital assistant device, a mobile telephone device, a game console device, a set-top box device, and so on. Although not shown, the system 100 can accommodate plural client devices, coupled to the server 104 via the network 106 and operated by plural respective users.

The server 104 can likewise be implemented using any type of computer processing functionality. In one case, the server 104 can represent one or more computer servers, one or more data stores, routing functionality, and so on. In one case, the server 104 can represent equipment provided at a single site. In another case, the functionality provided by the server 104 can be distributed over plural sites. For example, in one case, the server 104 can represent cloud storage that provides storage resources at one or more physical locations. A user can interact with the cloud storage using the client device 102 by accessing a network address associated with the server 104. In one case, one or more entities may administer the server 104; these entities may represent separate agents with respect to the user, that is, not under control of the user.

The network 106 can be implemented by a local area network, or a wide area network (such as the Internet), and some combination thereof. The network 106 can be physically implemented by any type of hardwired links, wireless links, routing functionality, gateway functionality, name servers, and so on. The network 106 can use any protocol or combination of protocols.

Figure 3:
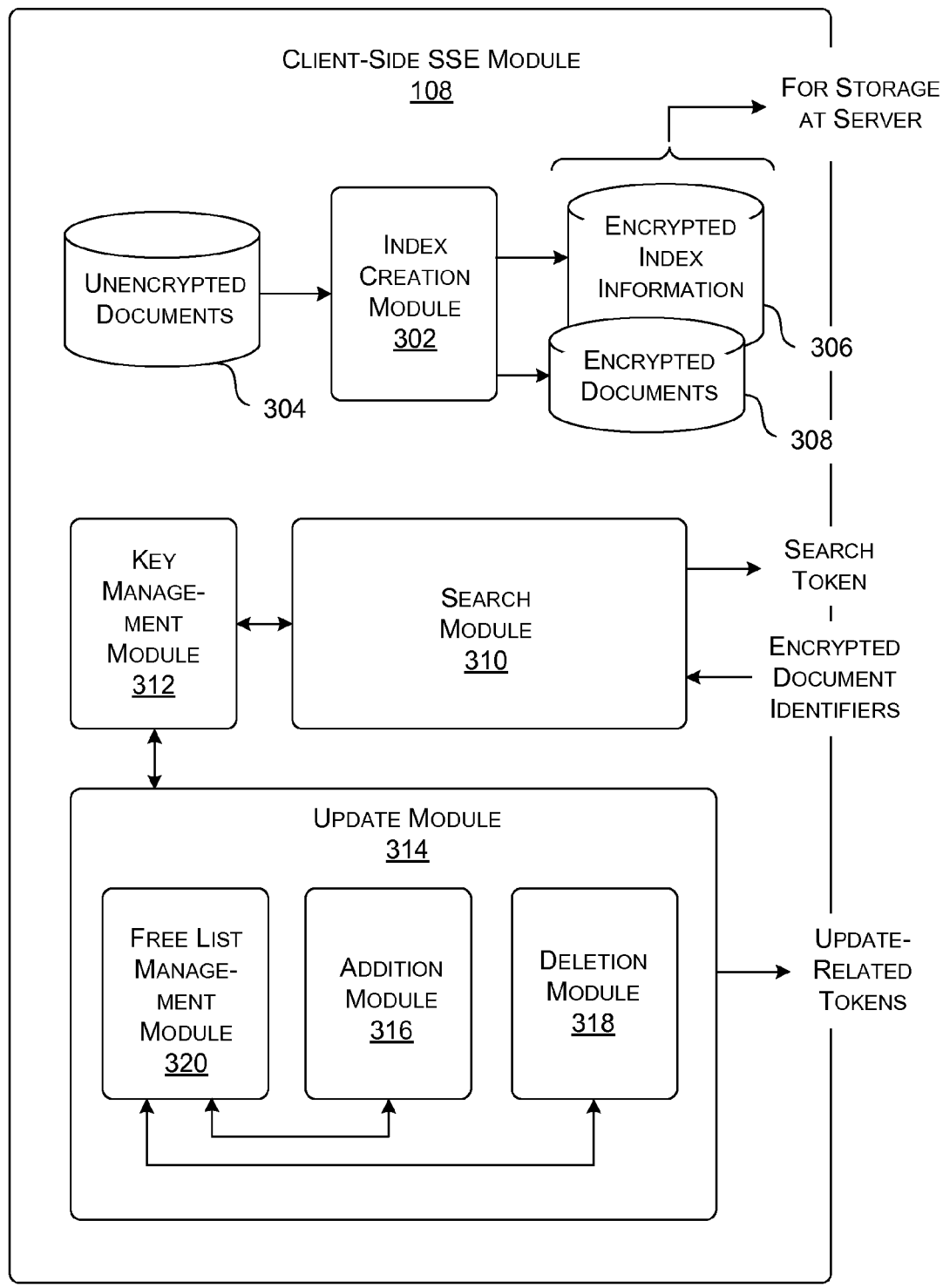
FIG. 3 shows illustrative details of the client-side SSE module of FIG. 1.

The client device 102 implements a client-side SSE module 108 and the server 104 implements a server-side SSE module 110. FIG. 3 (to be described below) provides additional details regarding the client-side SSE module 108 and FIG. 4 (to be described below) provides additional details regarding the server-side SSE module 110. Collectively, the client-side SSE module 108 and the server-side SSE module provide the SSE mechanism.

Figure 5:
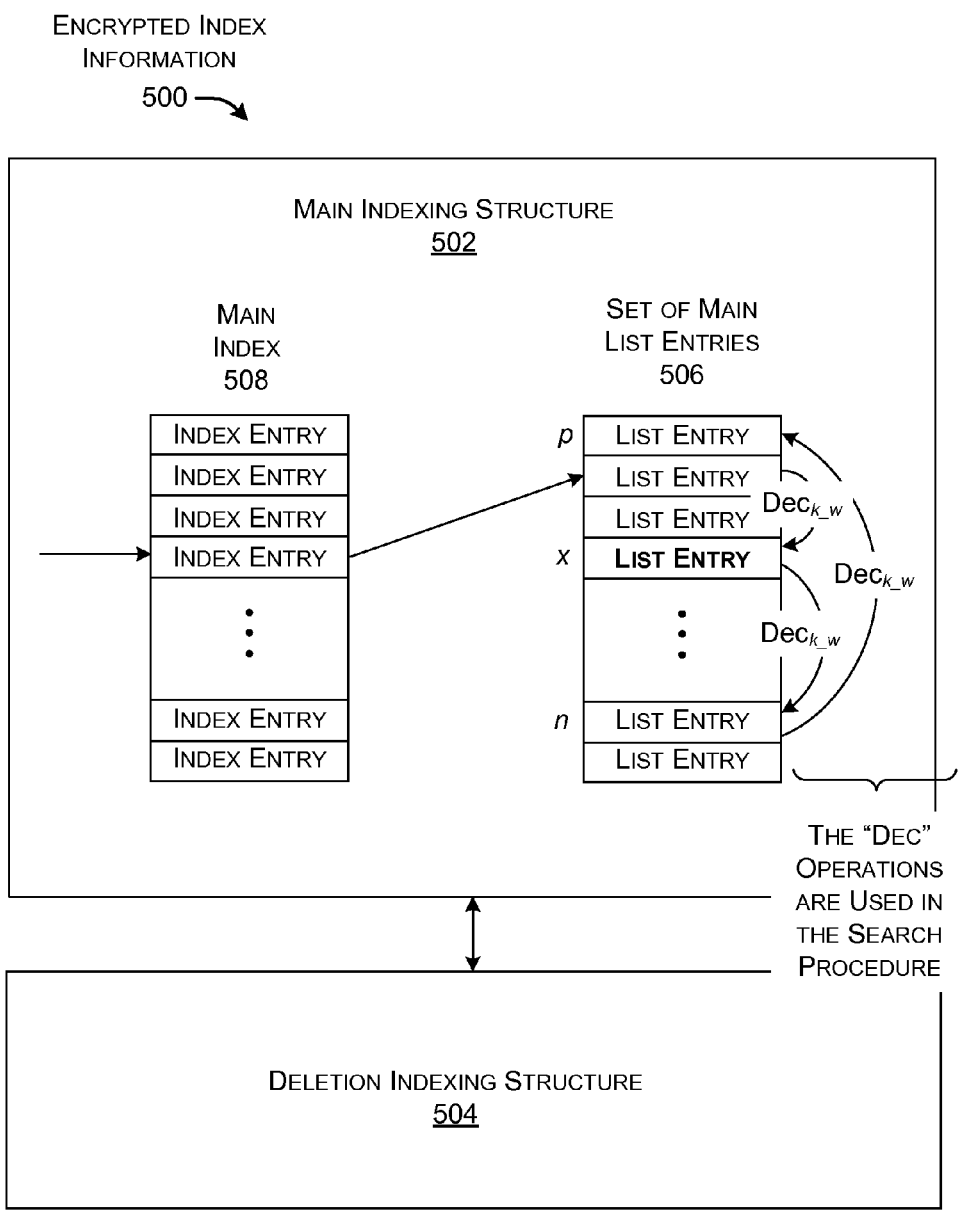
FIG. 5 shows illustrative details of encrypted index information provided to the remote server, including a main indexing structure and a deletion indexing structure.

In operation, a user can use the SSE mechanism to encrypt a collection of documents for storage in a data store 112 of the server 104. The user can also use the SSE mechanism to create and encrypt index information for storage in a data store 114 of the server 104. FIG. 5 (to be described below) provides additional information regarding illustrative data structures that can be used to implement the encrypted index information.

After the above-described setup tasks, the user can perform secure searches within the remotely-stored encrypted documents using the encrypted index information. More specifically, the user can submit a search token to the server 104. The search token is deterministically derived, in part, from a search term, but otherwise conceals the search term. In response to the search token, the server 104 returns search results that comprise a list of encrypted document identifiers; those document identifiers, in turn, correspond to documents which include or are otherwise associated with the search term. The user can decrypt the document identifiers and then request the server 104 to download one or more of the encrypted documents corresponding to one or more respective decrypted document identifiers. Generally, such a search is secure in the sense that no party (including the entity which administers the server 104) can discover: (a) the nature of the search that the user has performed; and (b) the nature of the search results provided to the user, or any other aspect of the corpus of encrypted documents. However, an external observer may, in some instances, reach certain conclusions by noting patterns of information flowing back and forth between the client device 102 and server 104.

A user can also use the SSE mechanism to update the encrypted documents and associated encrypted index information. In a first scenario, the user can use the SSE mechanism to add or delete an individual word respectively to or from the encrypted index information for a specified document. Section B (below) provides additional information regarding this embodiment. In a second scenario, the user can use the SSE mechanism to add or delete a group of words for an entire document respectively to or from the encrypted index information, where the group of words is associated with a document to be added to or removed from a corpus of documents. Section C (below) provides additional information regarding this embodiment. The remainder of this section (Section A) provides overview information which applies to both the first embodiment (per-word updating) and the second embodiment (per-document updating).

In one case, the user who operates the client device 102 represents any end-user consumer who wishes to store documents at the server 104 for any reason. In another case, the user may represent a member of an organization, such as an employee of a company. In that context, the user may store documents at the server 104 in connection with performing his or her duties within the organization.

Figure 2:
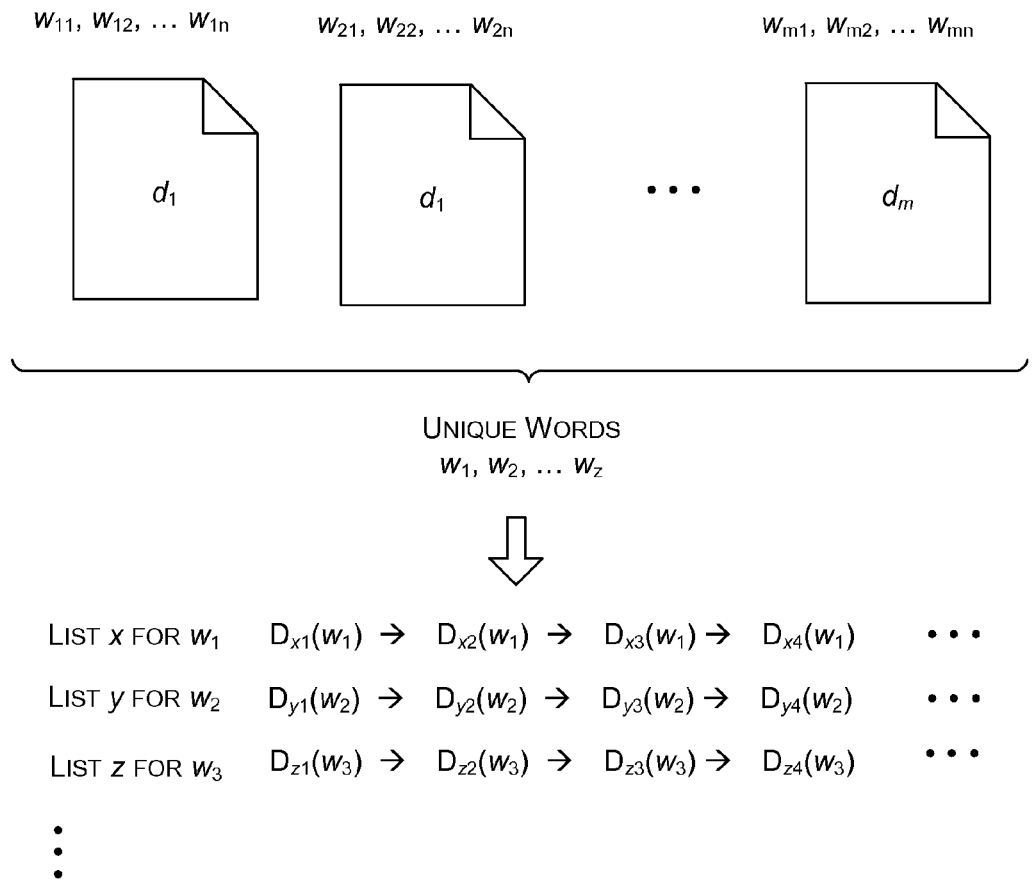
FIG. 2 shows an illustrative composition of a corpus of documents that can be stored, in encrypted form, at the remote server.

FIG. 2 provides additional information regarding the collection of documents that are encrypted and sent to the server 104 for storage. As used herein, the term "document" has broad connotation, referring to any unit of information of any nature. In one case, a document may refer to an item that includes a subset of words that form an integral part of the document itself. Alternatively, or in addition, a document may refer to an item that includes supplemental metadata associated therewith in the form of a subset of words. In general, a document can correspond to a text-bearing item, a song or other item containing audio information, a picture, a video, a financial record, and so on, or any combination thereof.

The encrypted index information represents the documents using respective encrypted document identifiers. Each document identifier can provide any type of descriptive information pertaining to a document. At a minimum, a document identifier can provide a code or the like which represents a corresponding document. In one implementation, all the document identifiers have the same fixed length. By virtue of this characteristic, the entity which administers the server-side SSE module 110 cannot glean any meaningful information from the encrypted document identifiers.

As will be set forth below in greater detail, the encrypted index information can organize the encrypted document identifiers into a plurality of linked lists. Each linked list includes a group of encrypted document identifiers associated with an identified word. For example, as shown in FIG. 2, a first list x includes a linked set of encrypted document identifiers associated with a first word $w_1$, a second list y includes a linked set of encrypted document identifiers associated with a second word $w_2$, and so on. The SSE mechanism retrieves a set of encrypted document identifiers associated with a word by identifying the leading encrypted document identifier in a list and then following the linked list to extract all of the encrypted document identifiers.

FIG. 3 shows details of the client-side SSE module 108. That SSE module 108 includes an index creation module 302 which processes a corpus of unencrypted documents in a data store 304. The index creation module 302 first identifies the unique words in the unencrypted documents. The index creation module 302 then generates the encrypted index information based on the unique words. The index creation module 302 can temporarily store the encrypted index information in a data store 306. The index creation module 302 can also encrypt the unencrypted documents themselves and store the resultant encrypted documents in a data store 308. The index creation module 302 can then upload both the encrypted index information and the encrypted documents to the server 104 for storage thereat.

A search module 310 allows a user to submit search tokens to the server 104 to perform searches over the encrypted documents. A search token includes search information that is deterministically derived, in part, from a search term, but which otherwise conceals the search term. A search token may also include key information generated by a key management module 312. Section B provides additional details regarding one illustrative composition of a search token.

An update module 314 prepares update-related tokens that carry out various updating operations. For example, an addition module 316 prepares and submits an addition token in connection with an addition operation. The addition operation involves adding a word to the encrypted index information for a document or adding a group of words to the encrypted index information for an entire document. A deletion module 318 prepares and submits a delete token in connection with a deletion operation. The deletion operation involves deleting a word from the encrypted index information for a document or deleting a group of words from the encrypted index information for an entire document.

A free list management module 320 plays a role in the management of a pool of free list entries, also referred to herein for brevity as the "free list." As will be described, a free list entry refers to an unused "slot" within the encrypted index information. When adding a word or group of words to the encrypted index information, one or more of these free list entries can be allocated for use in storing new index-related information. When deleting a word or group of words from the encrypted index information, one or more entries that provide existing index-related information can be returned to the pool of free list entries. In connection therewith, the free list management module 320, in conjunction with the addition module 316 and the deletion module 318, can generate and submit free list tokens to the server 104. The server 104 operates on the free list tokens to remove/add free list entries from/to the pool of free list entries. Further, the free list management module 320 can extend the pool of free list entries by generating and submitting an entire block of free list tokens.

Figure 4:
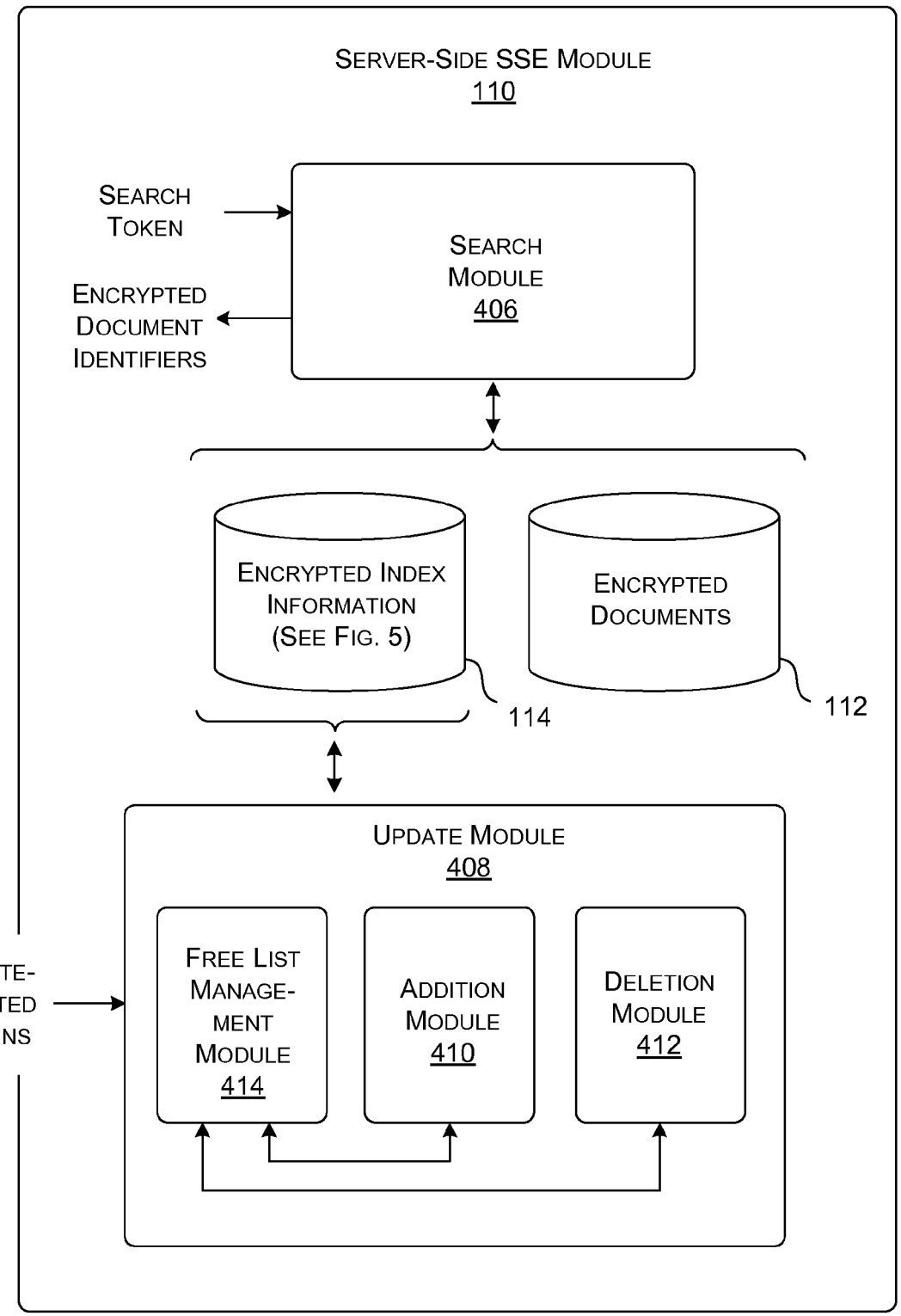
FIG. 4 shows illustrative details of the server-side SSE module of FIG. 1.
Figure 10:
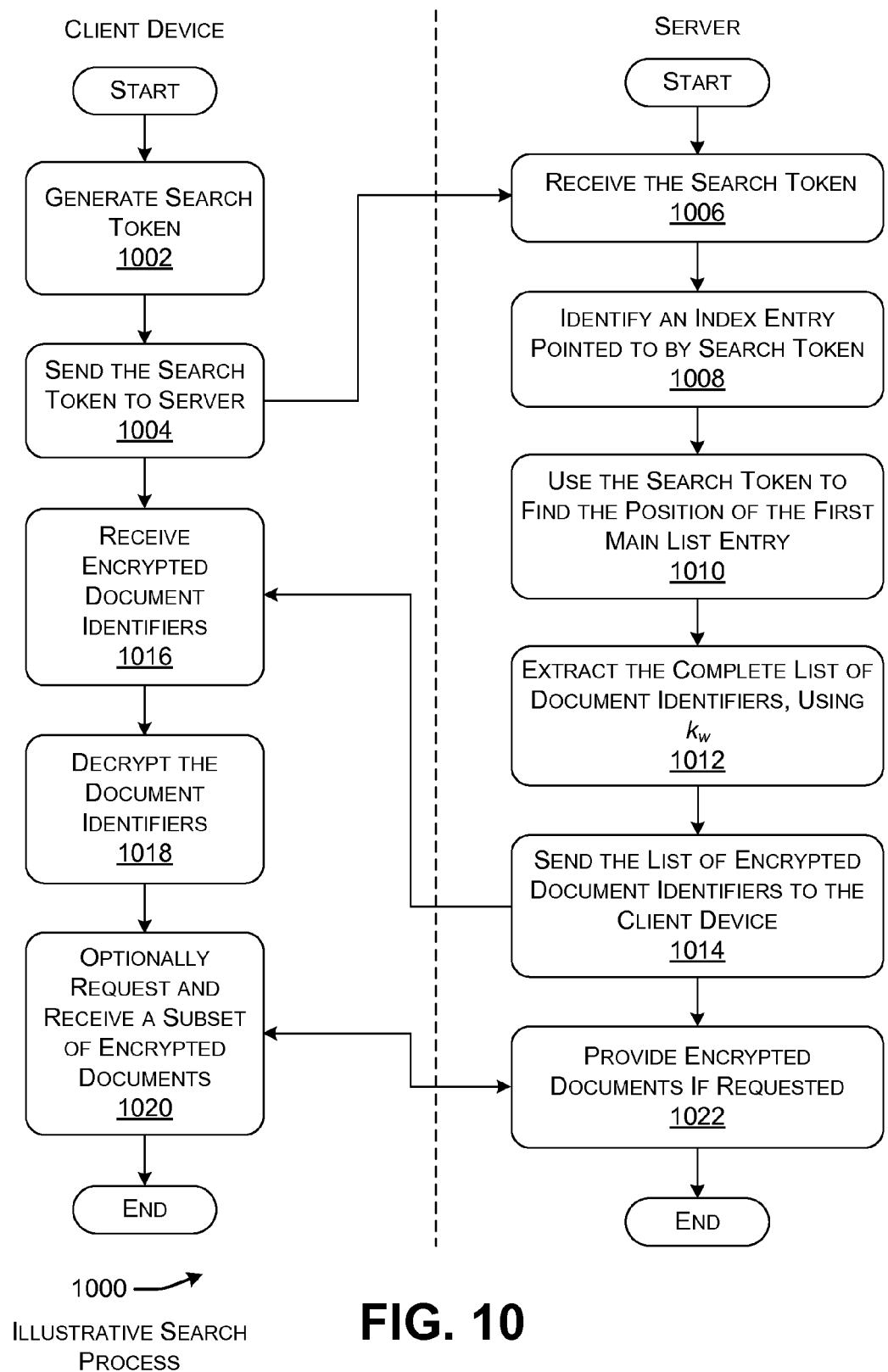
FIG. 10 is a flowchart that describes one way in which the client device and remote server can interact to perform a search operation, using the encrypted index information provided in the method of FIG. 9.

FIG. 4 shows details of the server-side SSE module 110. The components of the server-side SSE module 110 complement corresponding modules in the client-side SSE module 108. Namely, the server-side SSE module 110 includes a data store 112 that provides the encrypted documents, as well as a data store 114 that provides the encrypted index information. The server-side SSE module 110 also includes a search module 406 for performing searches based on the encrypted index information. Namely, the search module 406 receives a search token from the client device 102. The search module 406 then identifies and returns a list of encrypted document identifiers based on the search token. FIG. 10 (described below) provides additional details regarding one manner of operation of the search module 406 provided by the server-side SSE module 110.

A server-side update module 408 performs updating tasks which complement the operations performed by the client-side update module 314. For example, an addition module 410 receives an addition token from the client device 102 and, in response, adds a word to the encrypted index information for a document or adds a group of words to the encrypted index information for an entire document (where that document is being added to the corpus of documents). A deletion module 412 receives a delete token from the client device 102 and, in response, deletes a word from the encrypted index information for a document or deletes a group of words from the encrypted index information for an entire document (where that document is being deleted from the corpus of documents). A free list management module 414 manages free list entries in the encrypted index information, e.g., either by converting free list entries to used list entries, converting used list entries to free list entries, or by extending the number of free list entries.

Figure 13:
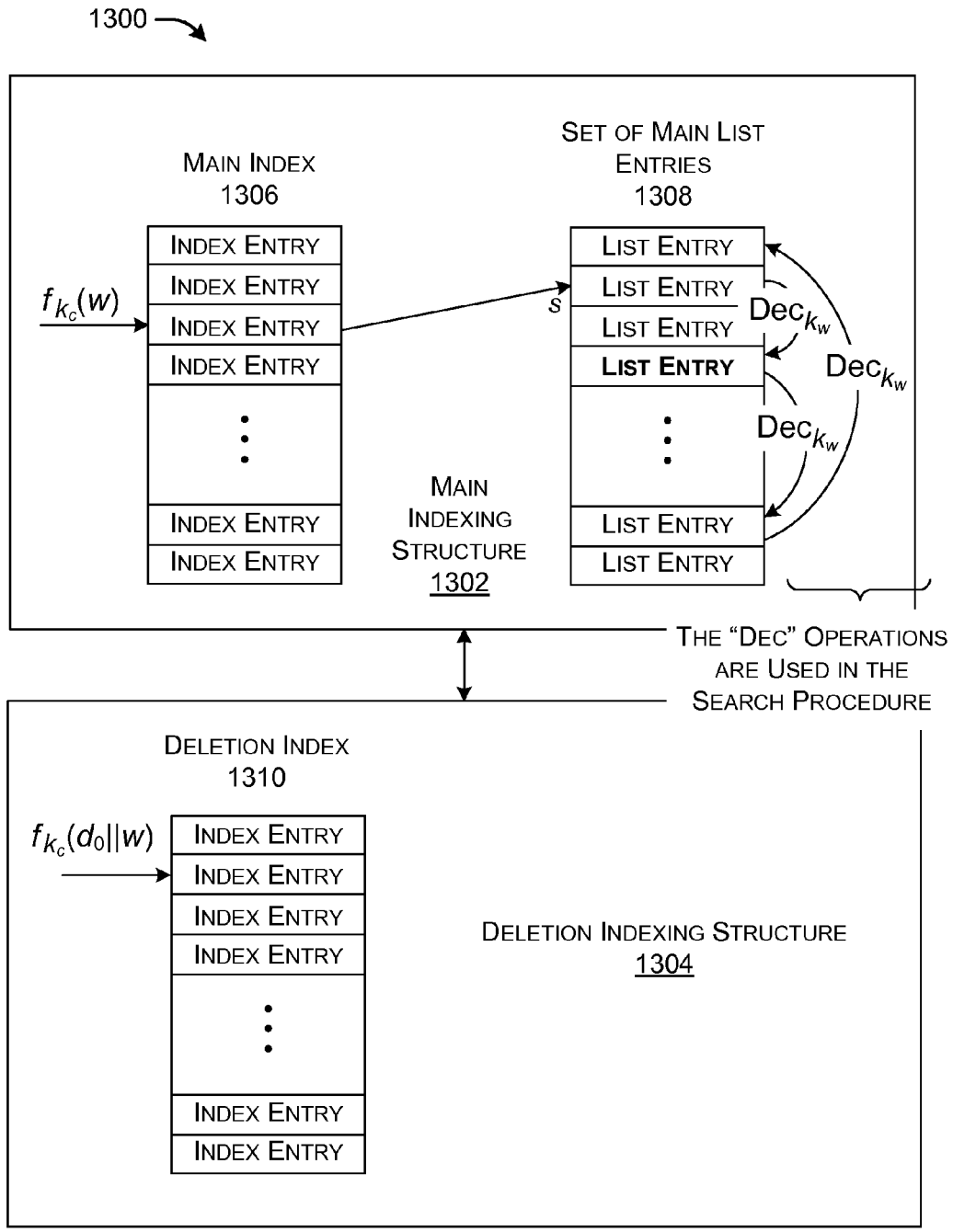
FIG. 13 shows an implementation of the encrypted index information which accommodates word-based addition and deletion.
Figure 16:
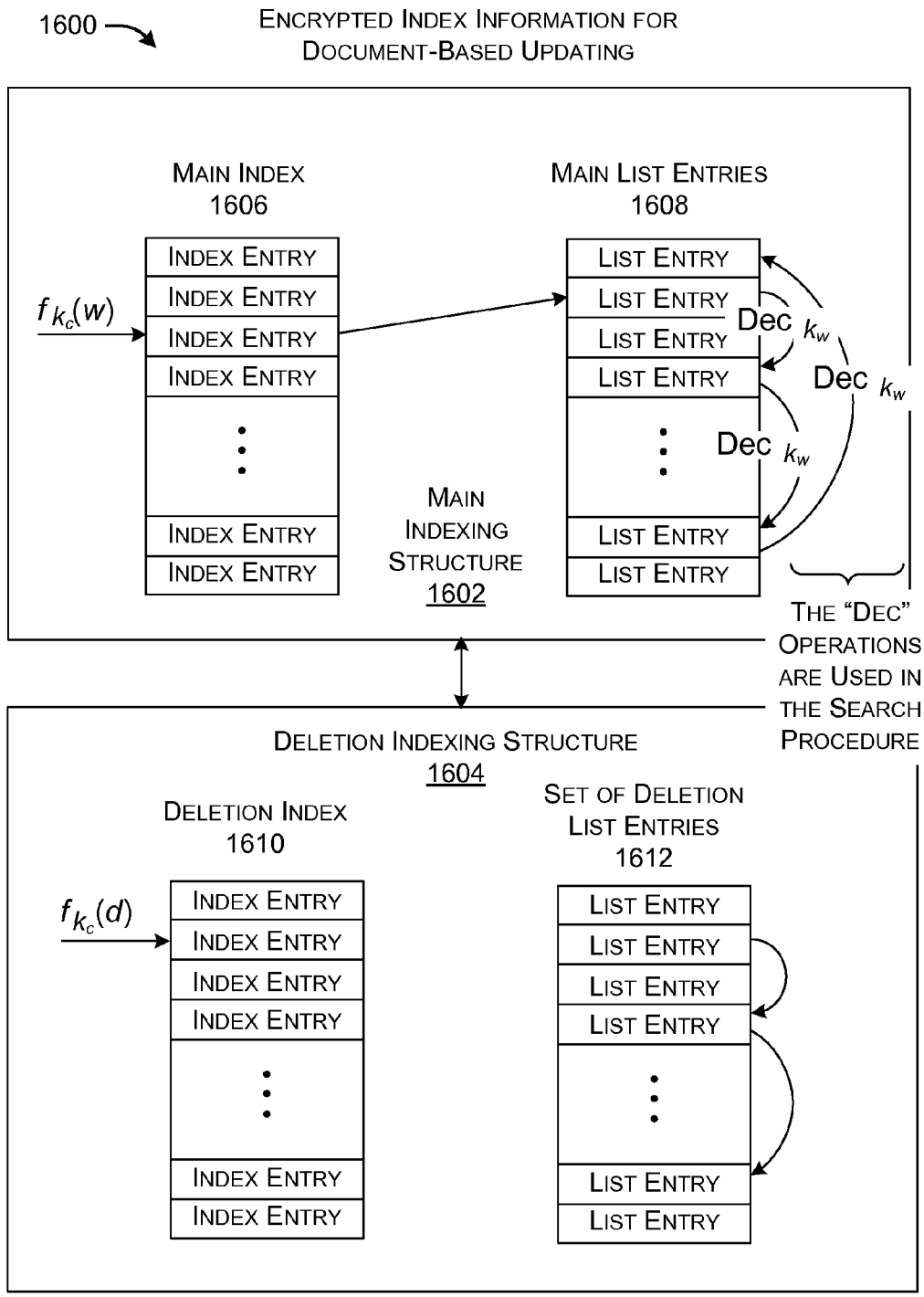
FIG. 16 shows an implementation of the encrypted index information which accommodates document-based addition and deletion.

FIG. 5 provides general information regarding data structures that can be used to implement encrypted index information 500. FIGS. 13 and 16 (to be described below) provide additional detail regarding two respective implementations of the data structures shown in FIG. 5.

The encrypted index information 500 includes two data structures, a main indexing structure 502 and a deletion indexing structure 504. Starting with the main indexing structure 502, this data structure includes two parts, a main index 508 and a set of main list entries 506. The set of main list entries 506 correspond to respective elements in the lists of document identifiers (introduced in the context of FIG. 2). As shown in FIG. 5, the entries in the lists are arranged in random fashion to conceal the association between entries and lists.

A current position within any given list is specified herein as position x. The position prior to the position x corresponds to position p. And the subsequent position corresponds to position n. If the current position x corresponds to the beginning of the list, then the prior position p is 0. If the current position x corresponds to the end of the list, then the next position is 0. Each position in a list also includes linking information which describes its connection to its prior and subsequent list entries. Thus, given a key $k_w$ for a word w being searched, the server 104 can follow and decrypt the entries in a list, to extract a list of encrypted document identifiers associated with word w.

The main index 508 provides a list of index entries which identify the respective starting positions of the lists in the set of main list entries 506. That is, a search token includes search information which identifies an index entry in the main index 508. The search information also includes information that can be used to decrypt the index entry, to thereby uncover the starting position of a corresponding list in the set of main list entries 506.

The deletion indexing structure 504 includes various bookkeeping information regarding the set of main list entries 506. For instance, for each current position x, the deletion indexing structure 504 maintains information pertaining to its prior position p and its next position n in the set of main list entries 506. The prior position p and next position n also correlate to positions in the deletion indexing structure 504. Thus, for each current position x, the deletion indexing structure 504 also identifies the deletion index positions that correspond to the p position and the n position. The update module 408 of the server-side SSE module 110 uses the deletion indexing structure 504 to perform appropriate list patching when words (or groups of words) are added and/or deleted to/from the encrypted index information. Namely, as will be clarified below, the update module 408 applies patching to both the set of main list entries 506 and the deletion indexing structure 504 itself.

Figure 6:
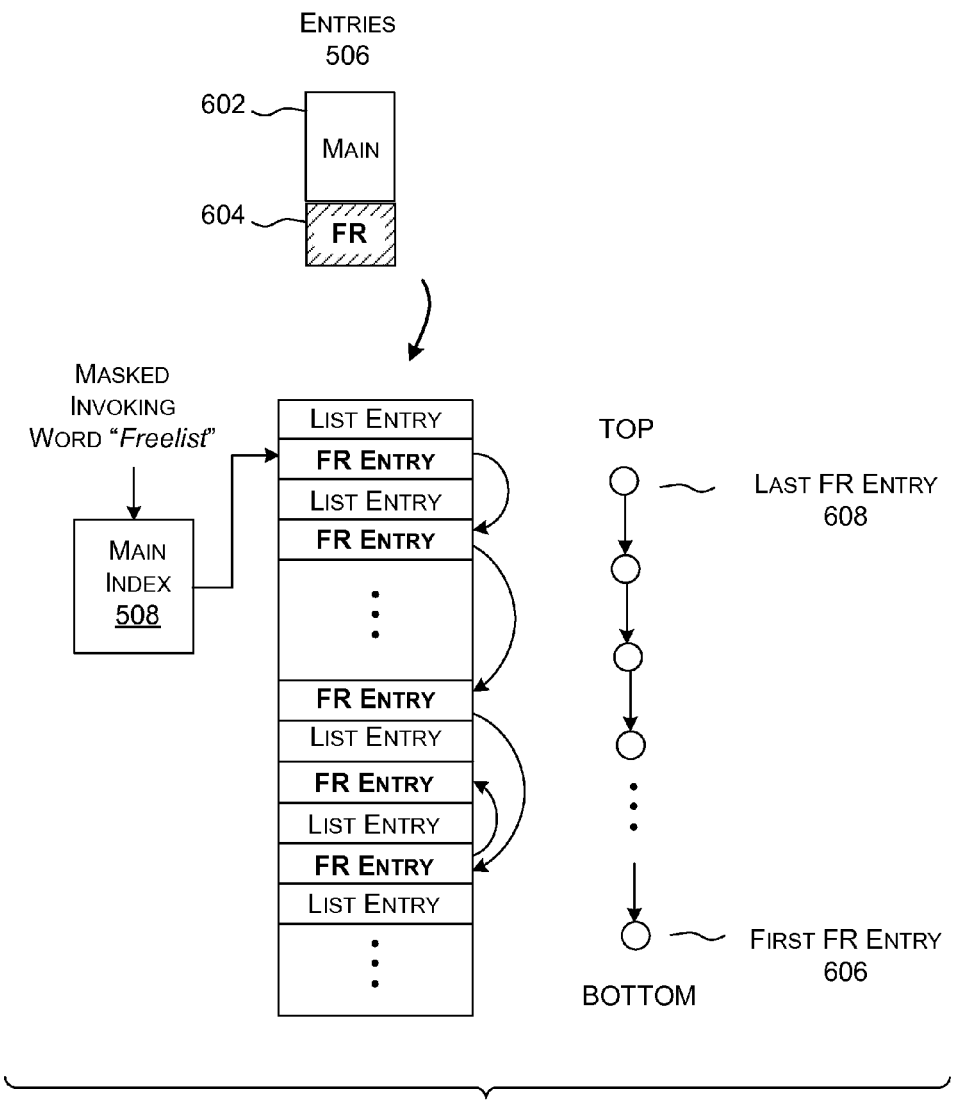
FIG. 6 shows illustrative details of a pool of free list entries provided by the encrypted index information of FIG. 5.

FIG. 6 shows one possible organization of free list entries in the set of main list entries 506. More specifically, as indicated at the top portion of FIG. 6, the set of main list entries 506 can include two portions. A first portion 602 corresponds to main list entries that are currently being used to represent document identifiers in respective lists. These entries are referred to as "used" entries herein. A second portion 604 corresponds to a pool of free list entries. As the name suggests, each entry in the pool of free list entries is not currently being used to represent an element within a list. But it can be later called into use when needed, e.g., when a word is added to the encrypted index information or a group of words is added to the encrypted index information.

As indicated in FIG. 6, the free list entries are dispersed among the main list entries in random fashion. The pool of free list entries itself forms a linked list having a first free list entry 606 (corresponding to the first entry added to the list) and a last free list entry 608 (corresponding to the last entry added to the list). When conceptualized as a stack, the first entry 606 corresponds to the bottom of the list and the last entry 608 corresponds to the top of the list. The entries in the free list are linked in reverse. An index entry in the main index 508 identifies the position of the first free list entry 606. This index entry can be accessed by submitting a free list token which derives from (but otherwise conceals) the word "freelist." The use of the word "freelist" is, of course, arbitrary; any other command word can be used. To distinguish between the special command word "freelist" and ordinary searchable words, the bit "0" can be prepended to ordinary search words, while the bit "1" can be prepended to the word "freelist," or vice versa. According to one manner of use, for an addition operation, the user can submit n new free list tokens to the server-side SSE module 110. The server-side SSE module 110 can use the n free list tokens to identify and decrypt the topmost n free list entries (starting from the last free list entry 608), upon which it re-designates these entries as n new "used" entries. Likewise, for a deletion operation, the user again provides n free list tokens. The server-side SSE module 110 uses the n free list tokens to encrypt and create n new free list entries.

Figure 7:
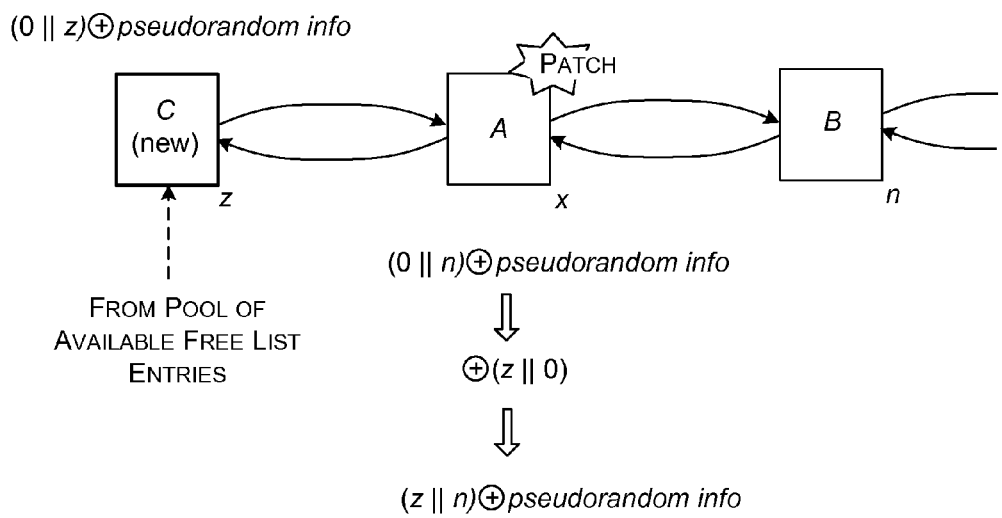
FIG. 7 shows one manner in which the SSE mechanism of FIG. 1 can patch the encrypted index information of FIG. 5, to thereby accommodate an addition operation.
Figure 8:
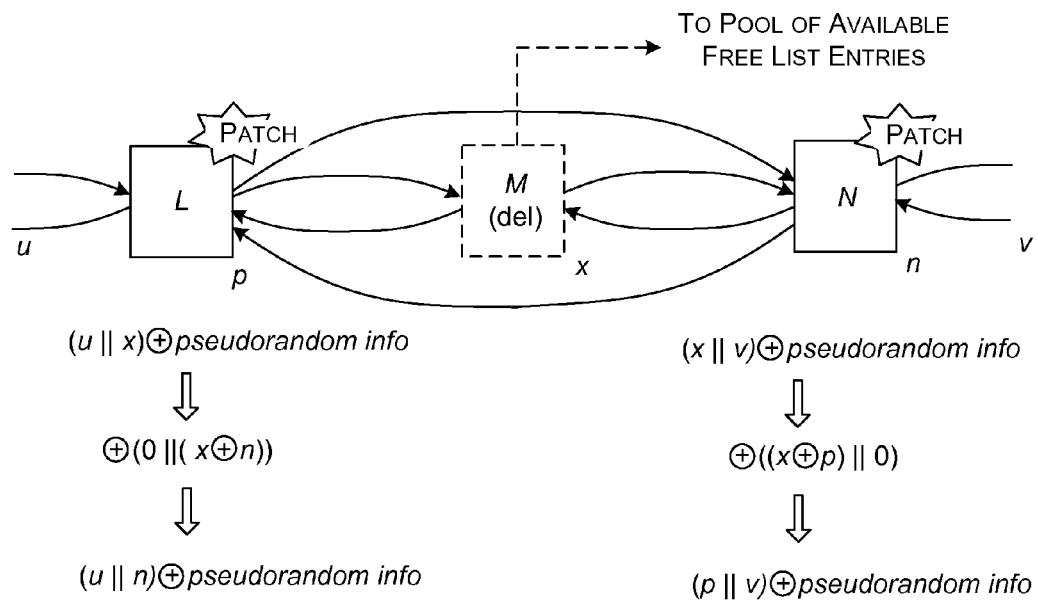
FIG. 8 shows another way in which the SSE mechanism of FIG. 1 can patch the encrypted index information of FIG. 5, to thereby accommodate a deletion operation.

FIGS. 7 and 8 provide high-level information regarding one manner in which the update module 408 of the server-side SSE module 110 can patch the set of main list entries 506. The update module 408 can perform a similar patching operation for entries in the deletion indexing structure 504. In the following, the symbol $\|$ represents the concatenation of two values. For example, 305$\|$405 corresponds to the value 305405. Parentheses denote the grouping of elements.

First consider FIG. 7. This figure shows a main list entry A at position x. Main list entry A initially corresponds to the beginning of a list, having a next list entry B at position n. Further assume that the current main list entry A at position x contains masked linking information which identifies the next main list entry B at position n. The masked linking information is generated using a malleable encryption scheme; the encryption scheme is malleable insofar as it produces masked information that can be modified without decrypting the masked information (as will be set forth below). Without limitation, in one implementation, malleable encryption can be achieved by combining the value n with pseudorandom information using an XOR operation, represented by the symbol $\oplus$. The combination of the value n with pseudorandom information using the XOR operation gives n itself, as modified, the appearance of randomness.

In this case, the update module 408 seeks to designate a new list entry C at position z as the head of the list, thus moving the list entry A at position x to the second element of the list. To perform this task, the update module 408 can patch the linking information for list entry A so that it indicates that the prior position is z, rather than 0. Moreover, the update module 408 can perform this patching without removing the pseudorandom information that masks the linking information. In other words, the update module 408 can perform the patching without learning that the position x is linked to the position n and the position z.

Now consider the case of FIG. 8. In this case, the update module 408 seeks to delete a list entry M at position x that lies between the list entry L at position p and the list entry N at position n. The position x is currently linked to the position p (and vice versa), and the position x is currently linked to the position n (and vice versa). To perform this task, the update module 408 can patch the linking information of list entry L so that it indicates that the next position corresponds to position n, rather than position x. Similarly, the update module 408 can patch the linking information of list entry N so that it indicates that the prior position corresponds to position p, rather than position x. Again, the update module 408 can perform this patching without learning the identities of the underlying positions behind the masks.

To accomplish the above objectives, the update module 408 performs a modification operation which complements whatever malleable encryption scheme has been used to encrypt the linking information. For example, if the linking information has been encrypted using the XOR operation, the update module 408 performs a modification operation which leverages the mathematical properties of the XOR operation. Namely, the XOR operation is both associative and commutative. Further, the use of the XOR operation to combine any value s with 0 yields the same value s, that is, $(s \oplus 0) = s$. Further, $(s \oplus s) = 0$. Further, it can be shown that $(r \oplus s) \oplus r = s$ (where r and s correspond to any values). Hence, assume that it is desired to swap the value r for the value s. This can be accomplished by applying the operation $\oplus (r \oplus s)$ to the value s. Furthermore, this swapping can be performed even for the case in which the value s is masked by pseudorandom information, e.g., s $\oplus$ psuedorandom information.

Given these insights, in FIG. 7, the update module 408 can combine the original position values (0$\|$n) with position values (z$\|$0), via an XOR operation. This yields the updated linking information (z$\|$n) for list entry A. In FIG. 8, the update module 408 can apply $\oplus (0\|(x \oplus n))$ to the original positions (u$\|$x) to yield the updated positions (u$\|$n) for list entry L. And the update module 408 can apply $\oplus ((x \oplus p)\|0)$ to the original positions (x$\|$v) to yield the updated positions (p$\|$v) for list entry N.

To close this introductory section, FIGS. 9-12 show procedures (900, 1000, 1100, 1200) that explain the operation of the SSE mechanism in flowchart form. Since the principles underlying the operation of the SSE mechanism have already been described above, certain operations will be addressed in summary fashion below.

Figure 9:
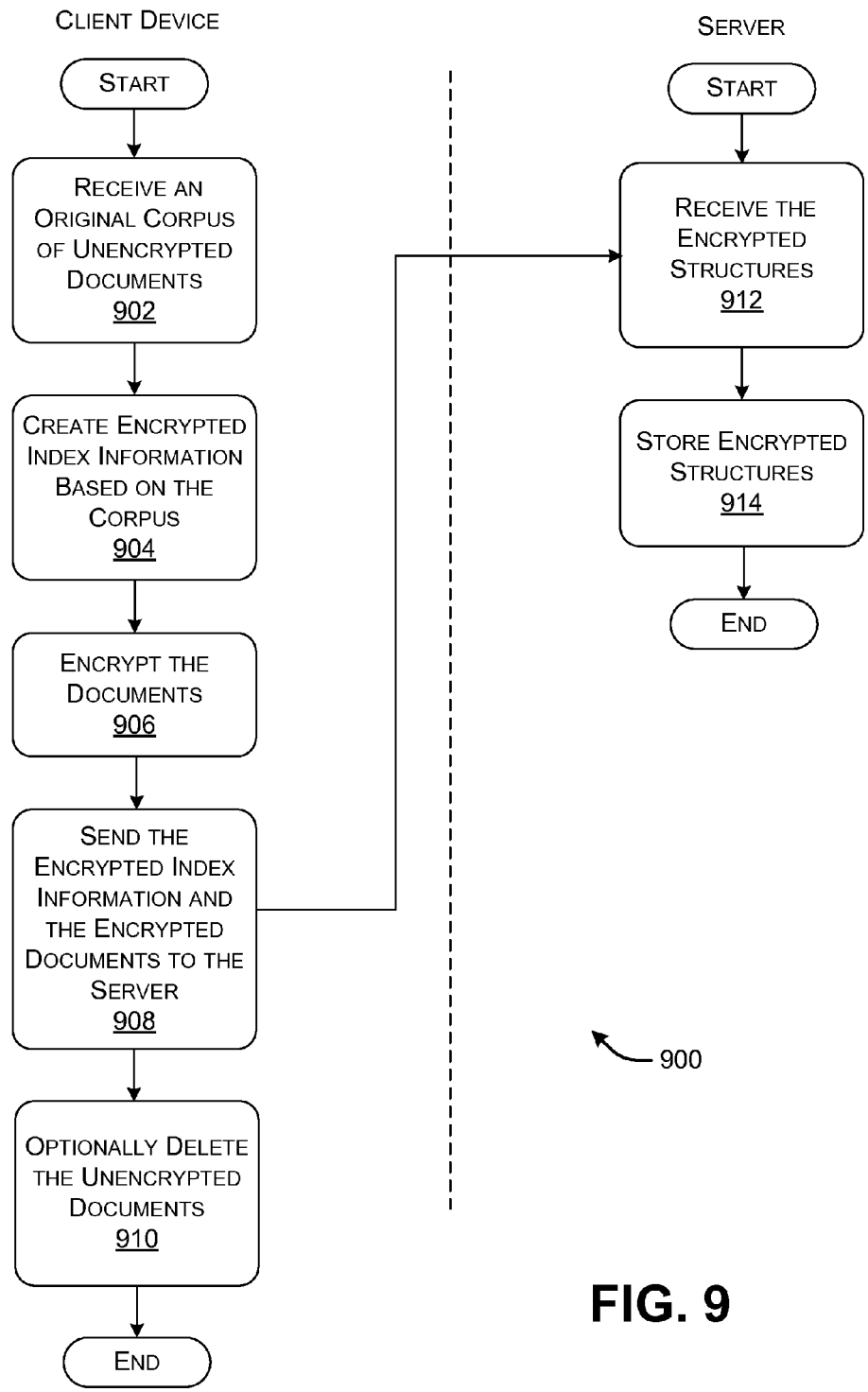
FIG. 9 is a flowchart that describes one way in which the client device can provide encrypted index information and encrypted documents to the remote server.

Starting with FIG. 9, this figure shows a procedure 900 for creating the encrypted index information and sending it to the server 104. In block 902, the client device 102 receives an original corpus of unencrypted documents of any type. In block 904, the client device 102 creates the encrypted index information based on the corpus of unencrypted documents. In block 906, the client device 102 encrypts the documents themselves. In block 908, the client device 102 sends the encrypted index information and the encrypted documents to the server 104. In block 910, the client device 102 optionally deletes its local copy of the unencrypted documents, and/or the encrypted documents, and/or the encrypted index information.

In block 912, the server 104 receives the encrypted index information and the encrypted documents. In block 914, the server 104 stores the encrypted index information and the encrypted documents.

FIG. 10 shows a procedure 1000 for performing searches based on remotely stored encrypted index information. In block 1002, the client device 102 generates a search token that is deterministically derived, in part, from a word to be searched. In block 1004, the client device 102 sends the search token to the server 104. In block 1006, the server 104 receives the search token. In block 1008, the server 104 uses search information in the search token to identify an index entry in the main index 508. In block 1010, the server 104 then uses the search information in the search token to decrypt the identified index entry. This operation yields the position of a first list entry in a linked list of list entries. The list entries, in turn, are associated with respective encrypted document identifiers. In block 1012, the server 104 extracts the complete list of encrypted document identifiers by following the linked list, starting at the first element identified by the main index entry. To perform this task, the server 104 uses a decryption key $k_w$ provided by the search information. In block 1014, the server 104 sends the list of encrypted document identifiers to the client device 102.

In block 1016, the client device 102 receives the list of encrypted document identifiers. In block 1018, the client device decrypts the list of encrypted document identifiers. In block 1020, the client device 102 optionally requests a subset of encrypted documents identified in the search results, and, in block 1022, the server 104 provides those documents.

Figure 11:
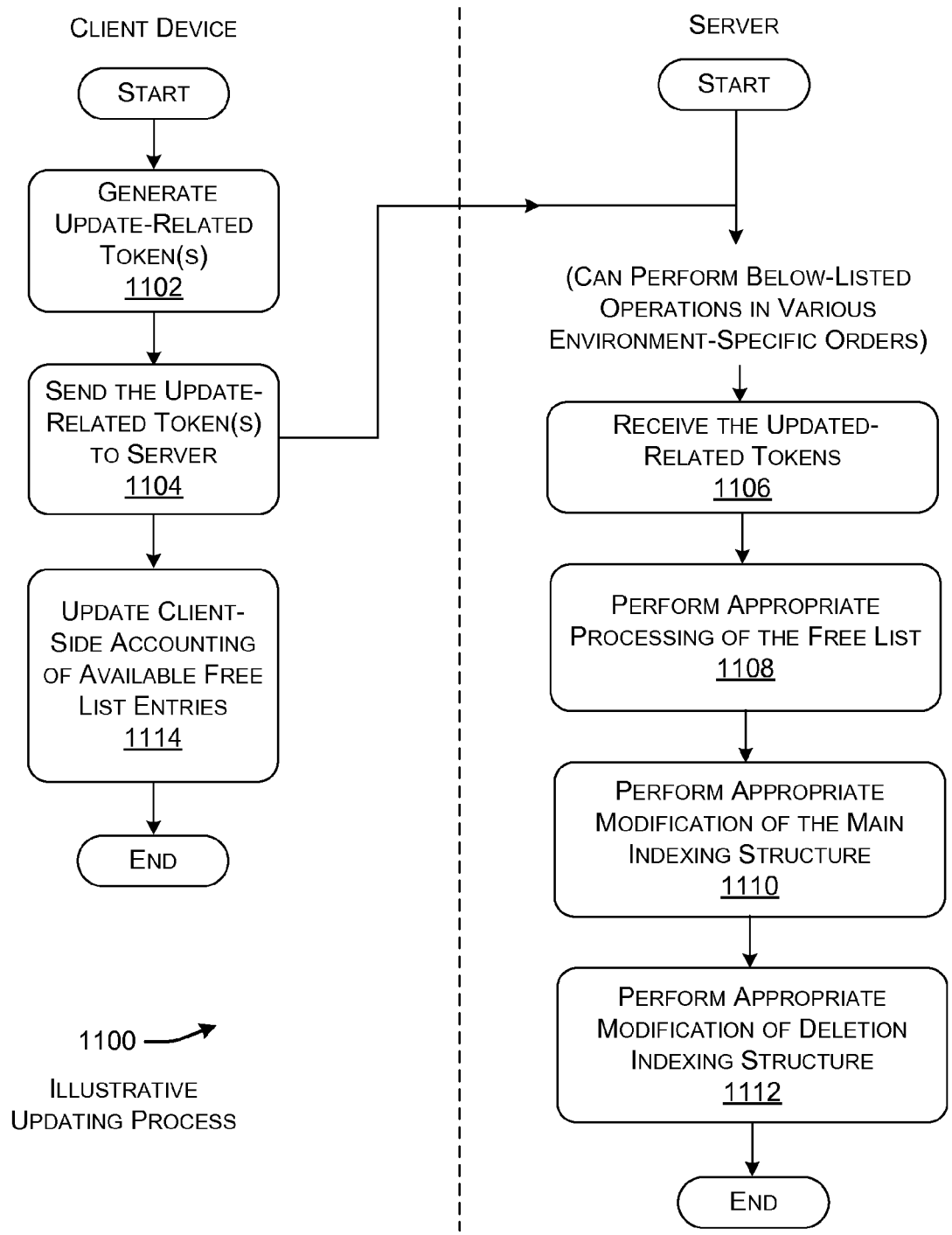
FIG. 11 is a flowchart that describes one way in which the client device and remote server can interact to perform an updating operation.

FIG. 11 provides a high-level overview of an update operation performed by the SSE mechanism. The update operation may correspond to an addition operation or a deletion operation. The update operation may further operate on a word level or document level.

In block 1102, the client device 102 generates at least one update-related token associated with the update operation to be performed. In block 1104, the client device 102 sends the updated-related token to the server 104. In block 1106, the server 104 receives the update-related token. In block 1108, the server 104 performs appropriate processing of the pool of free list entries, e.g., by converting an unused list entry to a used list entry, or vice versa. In block 1110, the server 104 performs appropriate modification of the main indexing structure 502, e.g., by patching linking information contained therein to account for the addition or removal of a list entry. Similarly, in block 1112, the server 104 performs appropriate modification of the deletion indexing structure 504. The parenthetical remark in FIG. 11 indicates that the order of operations shown in FIG. 11 can be varied for different types of update operations. In block 1114, the client device 102 updates a local count of the number of free list entries that result from the updating operation.

Figure 12:
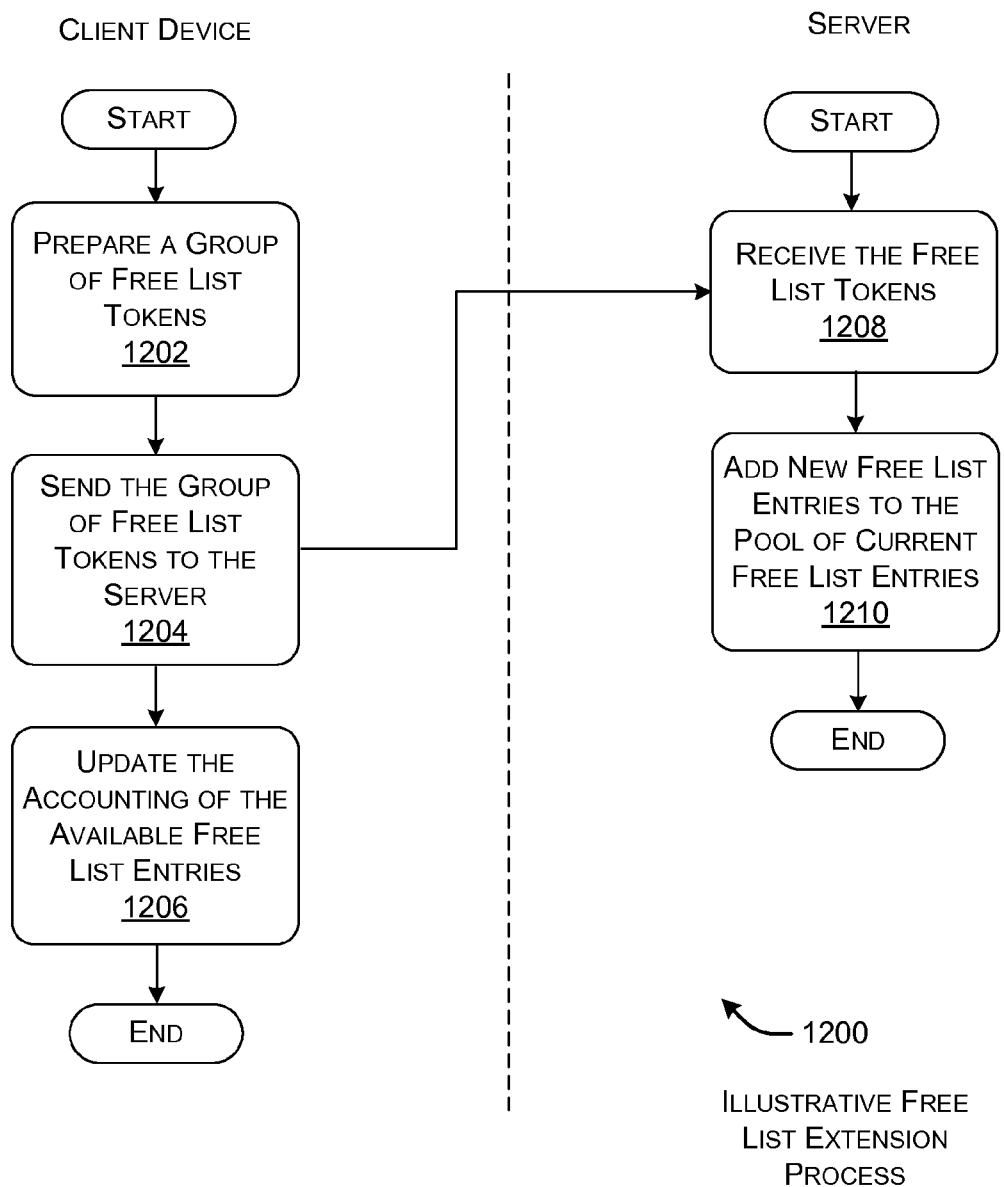
FIG. 12 is a flowchart that describes one way in which the client device and remote server can interact to extend a pool of free list entries.

FIG. 12 shows a procedure 1200 whereby the SSE mechanism extends the pool of free list entries. In blocks 1202 and 1204, the client device 102 generates and sends one or more free list tokens to the server 104. In block 1206, the client device 102 updates a local count of the number of free list entries that result from the extension operation. In block 1208, the server 104 receives the free list tokens. In block 1210, the server 104 adds one or more new free list entries to the set of main list entries 506 based on the free list tokens that have been received. That is, if n free list tokens have been received, the server 104 adds n free list entries.

B. Word-Based Implementation

As described above, a first implementation of the SSE mechanism performs updating on a per-word basis, e.g., by adding or deleting a word to/from the encrypted index information for an identified document. A second implementation of the SSE mechanism performs updating on a per-document basis, e.g., by adding or deleting a group of words to/from the encrypted index information for an entire document containing the group of words. This section provides illustrative details regarding the per-word implementation.

FIG. 13 shows encrypted index information 1300 that can be used in the per-word implementation. The encrypted index information 1300 includes a main indexing structure 1302 and a deletion indexing structure 1304, as described above in connection with FIG. 5. Further, the main indexing structure 1302 includes a main index 1306 and a set of main list entries 1308 that function in the manner described above.

Figure 14:
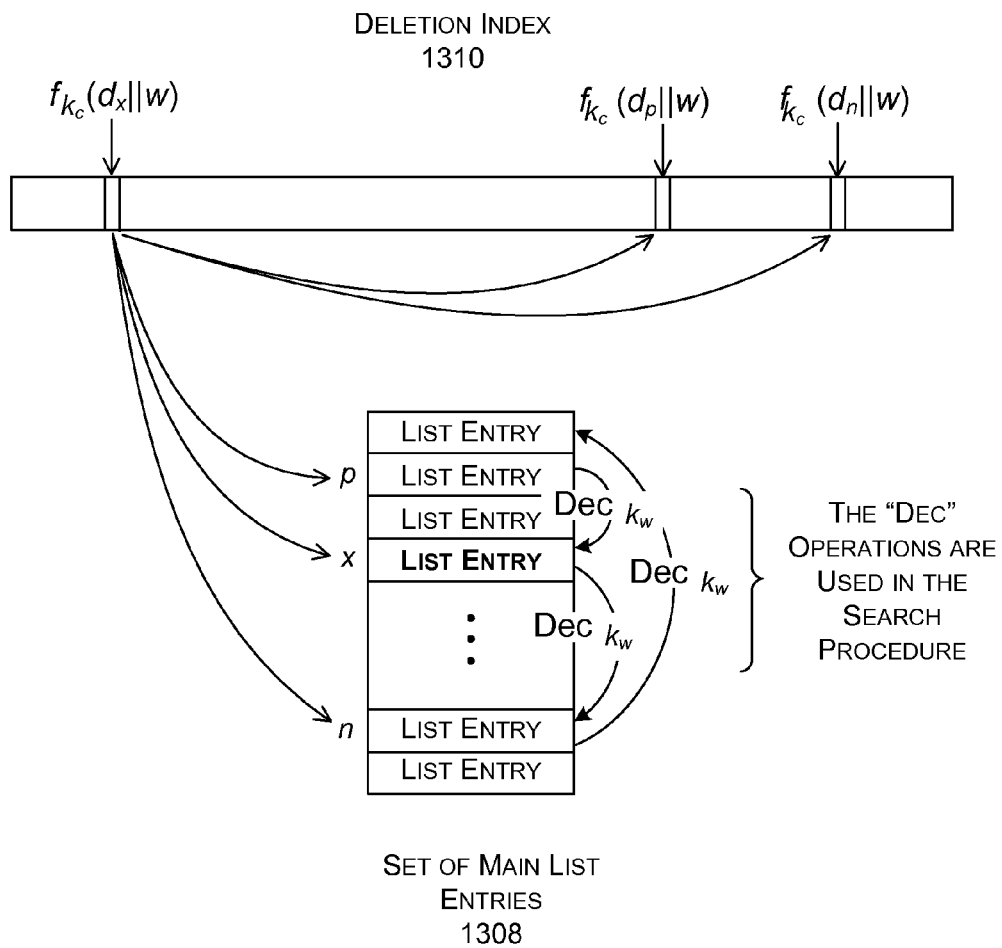
FIG. 14 shows the interaction of a deletion indexing structure and a set of main list entries within the encrypted index information of FIG. 13.

In this implementation, the deletion indexing structure 1304 includes a deletion index 1310. The deletion index 1310 includes a plurality of index entries. As indicated in FIG. 14, each index entry identifies a previous position p and a next position n for a current position x within the set of main list entries 1308. The index entry also identifies the positions in the deletion index 1310 which correspond to the identified previous position p and next position n. In the notation pointing to the deletion index 1310, $d_x$ refers to the document identifier for position x, $d_n$ refers to the document identifier referenced at position n, and $d_p$ refers to the document identifier referenced at position p.

The following description sets forth how the encrypted index information 1300 can be used to perform a search operation and an updating operation. In this description, the symbol $f$ represents any implementation of a random oracle that takes as input a key and another data value. In one example, the random oracle can be implemented as a pseudorandom function that produces a pseudorandom output (i.e., an output that appears random). More specifically, in one example, the pseudorandom function $f$ can be implemented by a hash function that operates on two input values (e.g., by applying a hash function to a concatenation of the two values). More specifically, without limitation, the pseudorandom function $f$ can be implemented using keyed-Hash Message Authentication Code (HMAC) functionality, in association with any hash algorithm, such as the well-known SHA-1, MD5, etc. The symbol $\|$ again represents the concatenation of two values. Parentheses again denote the grouping of elements. The term KDF refers to a key-derivation function. Enc refers to an encryption function, which can be implemented, without limitation, using the Advanced Encryption Standard (AES). This encryption operates on a document identifier in conjunction with a random value. The random value operates to ensure that the encryption operation produces a randomized output result.

To begin with, the key management module 312 of the client-side SSE module 108 can generate a number of keys, namely, keys $k_b$, $k_c$, $k_d$, $k_e$, $k_f$. The key $k_c$ is used in conjunction with a pseudorandom function by a process that maps words to index entries in the main index 1306. The key $k_b$ is used in conjunction with a pseudorandom function by a process that decrypts entries in the main index 1306. The key $k_d$ (referred to as a derivation key) is used to derive keys from the words and document identifiers using any type of Key Derivation Function (KDF). The key $k_e$ (referred to as an encryption key) is used to encrypt the document identifiers. Finally, the key $k_f$ (referred to as a free list key) is used in conjunction with a pseudorandom function by a process that encrypts entries in the free list.

As a next step, the index creation module 302 of the client-side SSE module 108 creates the encrypted index information. In this procedure, for each word w, the index creation module 302 generates a key $k_w = KDF_{k_d}(w)$ and chooses at random a free list entry from the pool of free list entries. The index creation module 302 sets a variable s to the location of this entry. The index creation module 302 then uses $d_0$, the first document in the document list, to generate the encrypted index entry $(s \| f_{k_c}(d_0 \| w)) \oplus f_{k_b}(w)$ for storage in the main index 1306. This index entry provides the start position (s) of the list of main list entries for word w, along with a token $(f_{k_c}(d_0 \| w))$ pointing into the deletion index 1310 for word w in document $d_0$. The index creation module 302 inserts this entry into the main index 1306, pointed to by $f_{k_c}(w)$.

The index creation module 302 then generates the main list entry for a document identifier $d_i$, with previous list entry at location p and next list entry at location n, by choosing a random available list entry at location x, choosing r and IV at random, and generating the main list entry r∥((p∥hp∥n∥hn)⊕∥$_{k_w}$(r))∥IV∥Enc$_{k_e}$(d$_i$,IV). The values hp and hn are Booleans that are true if there is a previous (respectively, next) entry in the list. The index creation module 302 also chooses other random values $r_1$, $r_2$, $r_3$, generates k$_{(d_i∥w)}$= KDF$_{k_d}$(d$_i$∥w), and adds the following to the deletion index 1310, pointed to by the value of $f_{k_f}$(d$_i$∥w):

$r_1∥r_2∥r_3∥(x∥p∥hp∥n∥hn)⊕f_{k_{(d∥w)}}(r_1)∥f_{k_c}(d_{(i-1)}∥w)⊕$
$f_{k_{(d∥w)}}(r_2)∥f_{k_c}(d_{(i+1)}∥w)⊕f_{k_{(d∥w)}}(r_3).$

After each word and its document lists have been processed in the above-described fashion, the index creation module 302 (in conjunction with the free list management module 320) generates the free list in its encrypted array as follows. The index creation module 302 maintains a count i of the current number of free list entries, and initializes i to the total number of free list entries. Then, the index creation module 302 finds a location x of the first entry to add to the free list and adds the index entry (x∥hn)⊕$f_{k_b}$(freelist) to the main index 1306, which is pointed to (and can be accessed by) the token $f_{k_c}$(freelist). To repeat, the word freelist can be distinguished from an ordinary searchable word by prepending a telltale bit to it. Further, the index entry can be padded so that it has the same length as other index entries. The list entry pointed to by this index entry corresponds to the first entry of the free list (as shown in FIG. 6). The j$^{th}$ entry in the free list within the main list entries 1308 has the following form, where x$_j$ refers to the location of the j$^{th}$ entry in the array of main list entries: (x$_{(j-1)}$∥hn)⊕$f_{k_f}$(j), where hn, as before, is a Boolean that states whether or not there is another entry in the free list.

After the index has been stored, the search modules (310, 406) can perform their respective roles to perform a search based on a word w. First, the search module 310 of the client-side SSE module 108, in conjunction with the key management module 312, generates the key k$_w$=KDF$_{k_d}$(w). The search module 310 then generates a search token having the following pieces of information (generally referred to as search information herein): S(w)=(k$_w$, $f_{k_c}$(w), $f_{k_b}$(w)). Upon receipt at the server 104, the search module 406 of the server-side SSE module 110 uses $f_{k_c}$(w) to find the appropriate index entry in the main index 1306. That index entry points to the first element in the appropriate list in the set of main list entries 1308. The search module 406 then uses $f_{k_b}$(w) to decrypt the index entry and find the first list entry in that list. Upon locating the first entry, the search module 406 can decrypt this entry and the remaining linked entries using the key k$_w$. The search module 406 then returns all of the encrypted document identifiers to the client device 102.

The updating operations performed by the update modules (314, 408) will now be described. As to the addition operation, the task of adding a word w to the encrypted index information for a document d is tantamount to adding a document identifier to a list associated with that word w. The addition module 316 of the update module 314 first chooses a random value r and then, in conjunction with the key management module 312, generates the key k$_{(d∥w)}$=KDF$_{k_d}$(d∥w). The addition module 316 then generates and sends the following update-related token to the server 104: A(d,w)= (k$_{(d∥w)}$, $f_{k_c}$(d∥w), $f_{k_c}$(w), $f_{k_b}$(w), r∥$f_{k_c}$(r)∥IV∥Enc$_{k_e}$(d,IV), $f_{k_f}$(freelistCount), $f_{k_c}$(freelist), $f_{k_b}$(freelist)). The integer freelistCount refers to the number of free list entries in the pool of free list entries. After generating this token, the addition module 316, in conjunction with the free list management module 320, decrements freelistCount by 1 (since one of the free list entries will be used in the course of the addition operation).

Upon receipt of this token at the server 104, the addition module 410, in conjunction with the free list management module 414 of the server-side SSE module 110, uses $f_{k_c}$(freelist), and $f_{k_b}$(freelist), to find and decrypt the appropriate free list index entry in the main index 1306. This reveals the location x that corresponds to the end of the free list in the set of main list entries 1308. The addition module 410 then uses $f_{k_f}$(freelistCount) to decrypt this list entry and find the previous element in the free list. It can then use $f_{k_b}$(freelist) to change the index entry in the main index 1306 to point to the new end of the free list (corresponding to what was previously the second-to-last element in the free list). The former last entry of the free list at location x will now be used to receive a new list entry associated with the added word w.

Next, the addition module 410 proceeds to patch the main indexing structure 1302. First, the addition module 410 uses $f_{k_c}$(w) and $f_{k_b}$(w) to find and decrypt the index entry for word w in the main index 1306. Assume that the index entry reveals that the position of the first entry in the list (in the set of main list entries 1308) is y, having a corresponding token of $f_{k_c}$(d$_y$∥w). Since the client device 102 has not provided k$_w$, the server 104 cannot decrypt the list entry at position y and cannot follow the list (as would be the case for an ordinary search operation). But the addition module 410 of the server 104 can use the XOR operation to combine y with the bits in the list entry at position y that refer to the next entry. This yields a result that can be stored in the list entry at position x (which was formerly the last entry of the free list). The addition module 410 can also use the XOR operation to combine x with the bits in the list entry at position y that refer to the previous entry, thus inserting the new list entry at the head of the list. Finally, the client can replace the index entry in the main index 1306 for w with (x∥$f_{k_c}$(d∥w)⊕$f_{k_b}$(w)). In brief, the addition module 410 accomplishes the type of patching outlined in FIG. 7, where a new entry is claimed from the free list and inserted as the first member of a list for a particular word w.

The addition module 410 then proceeds to patch up the deletion index 1310 so that it is conformant with the main indexing structure 1302. First, the addition module 410 chooses $r_1$, $r_2$, and $r_3$ at random and inserts the entry $r_1∥r_2∥r_{31}∥(x∥0∥false∥y∥true)⊕f_{k_{(d∥w)}}(r_1)∥0⊕f_{k_{(d∥w)}}(r_2)∥f_{k_c}(d_y∥w)⊕f_{k_{(d∥w)}}(r_3)$ as the value pointed to by $f_{k_f}$(d∥w) in the deletion index 1310. Then, the addition module 316 looks up the value for $f_{k_c}$(d$_y$∥w) and uses the XOR operation to combine the positions for the previous position and the previous token with x and $f_{k_c}$(d∥w), respectively. Note that the values encrypted at these positions are guaranteed to be 0, since the list entry for y corresponds to the first entry in the list.

To delete a word w from a document d, the deletion module 318 in conjunction with the key management module 312 (of the client device 102) generates the key k$_{(d∥w)}$=KDF$_{k_d}$(d∥w). The deletion module 318 then generates and sends the following delete token to the server 104: D(d,w)=(k$_{(d∥w)}$, $f_{k_c}$(d∥w), $f_{k_c}$(w), $f_{k_f}$(freelistCount+1), $f_{k_c}$(freelist), $f_{k_b}$(freelist)). The deletion module 318, in conjunction with the free list management module 320, then increments freelistCount by 1, since the deletion operation will result in converting a used main list entry to a free list entry.

Upon receipt of this update-related token, the deletion module 412 of the server 104 uses $f_{k_c}$(d∥w) to look up d∥w in the deletion index 1310. The value at that location is $r_1∥r_2∥r_3∥(x∥p∥hp∥n∥hn)⊕f_{k_{(d∥w)}}(r_1)∥f_{k_c}(d_p∥w)⊕f_{k_{(d∥w)}}(r_2)∥f_{k_c}(d_n∥w)⊕f_{k_{(d∥w)}}(r_3)$. The deletion module 412 can decrypt this entry using k$_{(d∥w)}$. The deletion module 412 then performs the following actions (but note that actions performed on the next and previous entries will only occur if those entries exist):

1. The deletion module 412 decrypts the free list index entry (in the main index 1306) in the manner described above to obtain the current end position y of the free list. The deletion module 412 then replaces the index entry in the main index 1306 with $x \oplus f_{k_b}(\text{freelist})$, thereby pointing to the new top position (x) of the free list. The deletion module 412 also writes $(y\|\text{true}) \oplus f_{k_f}(\text{freelistCount}+1)$ to the list entry (in the set of main list entries 1308) at position x. The deletion module 412 can insert random information for the rest of the entry length to pad it appropriately (to resemble other list entries).

2. The deletion module 412 then uses the XOR operation to combine the next-pointer position at list entry p with $(x \oplus n)$, and it uses the XOR operation to combine the previous-pointer position at list entry n with $(x \oplus p)$, thus patching the list without being able to decrypt any of its elements. FIG. 8 illustrates this type of patching operation.

3. The deletion module 412 then uses $f_{k_c}(d_p\|w)$ to look up the deletion index entry for the list entry at p. It uses the XOR operation to combine the next-pointer position with $(x \oplus n)$ and the next-token position with $f_{k_c}(d\|w) \oplus f_{k_c}(d_n\|w)$. The deletion module 412 then performs the symmetric operations on the entry in the deletion index 1310 corresponding to $f_{k_c}(d_n\|w)$.

4. The deletion module 412 then deletes the deletion index entry pointed to by $f_{k_c}(d\|w)$. The deletion module 412 can optionally replace this entry with a dummy entry provided in the deletion token.

5. If deletion has removed the last entry from a word list, then the deletion module 412 can remove this word list from the main index 1306.

Figure 15:
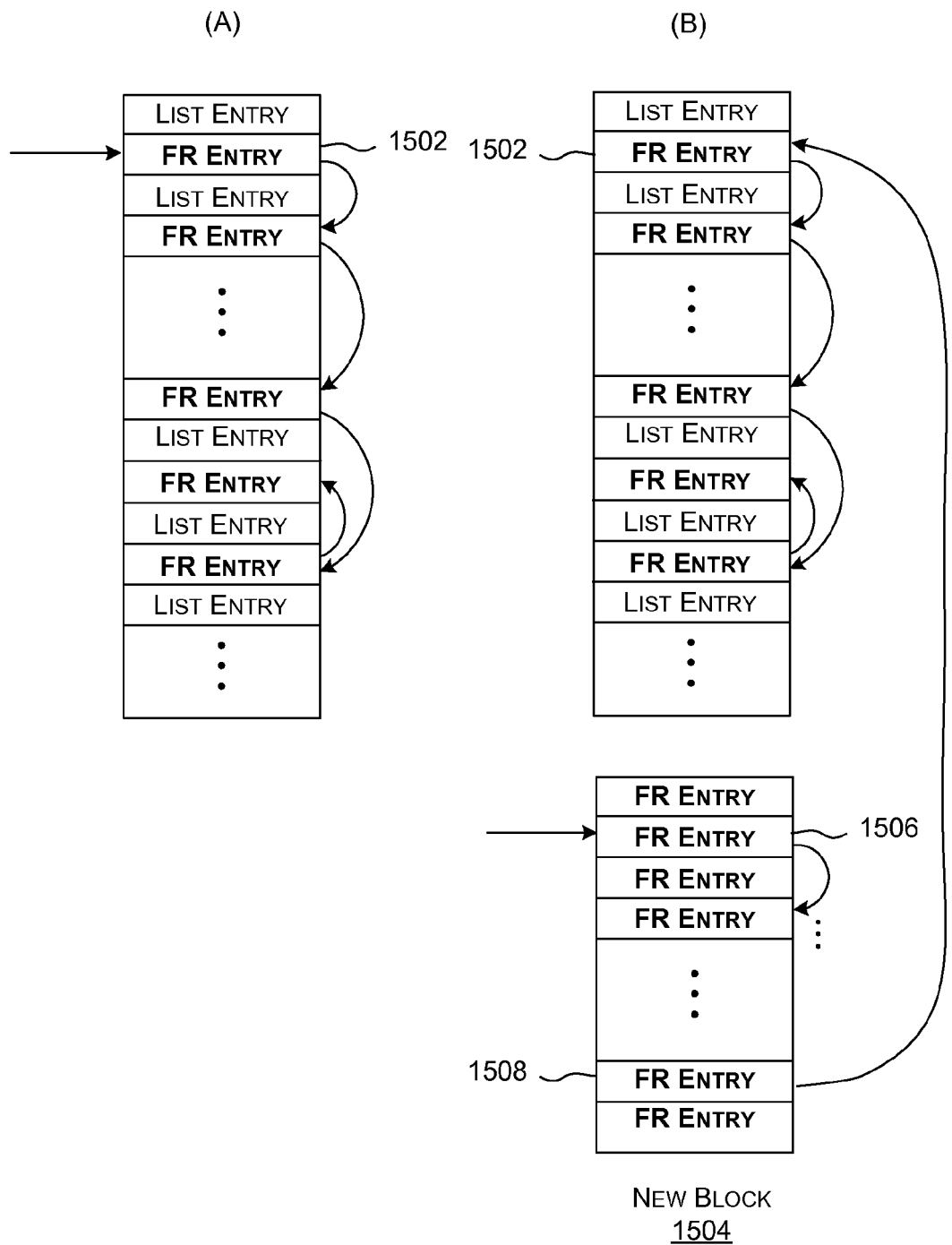
FIG. 15 shows one manner of appending a block of free list entries to an existing pool of free list entries.

Advancing to FIG. 15, this figure shows one way in which the free list management module 414 of the server-side SSE module 110 can extend the pool of free list entries. At the outset (at time A), the set of main list entries 1308 includes an original pool of free list entries dispersed among the regular (used) main list entries. Assume that the original access point to the pool of free list entries corresponds to free list entry 1502. The free list entry 1502 corresponds to the top of a linked list of free list entries (and also corresponds to the last-added entry to the free list).

At time B, the free list management module 414 appends a new block 1504 of free list entries to the existing pool of free list entries. In one case, the free list management module 414 can perform this task by defining a new access point within the block 1504 of free list entries, e.g., corresponding to the top-most free list entry 1506 in the block 1504. The free list management module 414 can then patch the bottom-most free list entry 1506 in the new block 1504 to the former top-most free list entry 1502.

C. Document-Based Implementation

This section provides illustrative details regarding the per-document implementation of the SSE mechanism. In this version, the SSE mechanism operates to add and delete groups of words, associated with entire documents, to/from the encrypted index information. Each document, in turn, includes a plurality of words associated therewith. In one implementation, the per-document version applies the same type of processing provided for individual words in the per-word implementation. But the per-document version duplicates these operations for each word in a document being added or deleted.

FIG. 16 shows encrypted index information 1600 that can be used in the per-document implementation. The encrypted index information 1600 includes a main indexing structure 1602 and a deletion indexing structure, as described above in connection with FIG. 5. Further, the main indexing structure 1602 includes a main index 1606 and a set of main list entries 1608 that function in the manner described above.

In this case, the deletion indexing structure 1404 includes a deletion index 1610 and a set of deletion list entries 1612. The set of deletion list entries 1612 provides a plurality of linked lists. Each linked list is associated with a document d, and has elements corresponding to the words w in the document d, arranged in random order. In other words, just as the set of main list entries 1608 provides lists of linked documents corresponding to respective words, the set of deletion list entries 1612 contains lists of linked words corresponding to respective documents. Hence, there is a one-to-one correspondence between the entries in the set of main list entries 1608 and the entries in the set of deletion list entries 1612. That is, a particular element in the set of main lists entries 1608 corresponds to a word-document pair that has a counterpart in the set of deletion list entries 1612. Further, the deletion list entries 1612 contains free list entries, and there is a one-to-one correspondence between free list entries in the main list entries 1608 and free list entries in the deletion list entries 1612.

Figure 17:
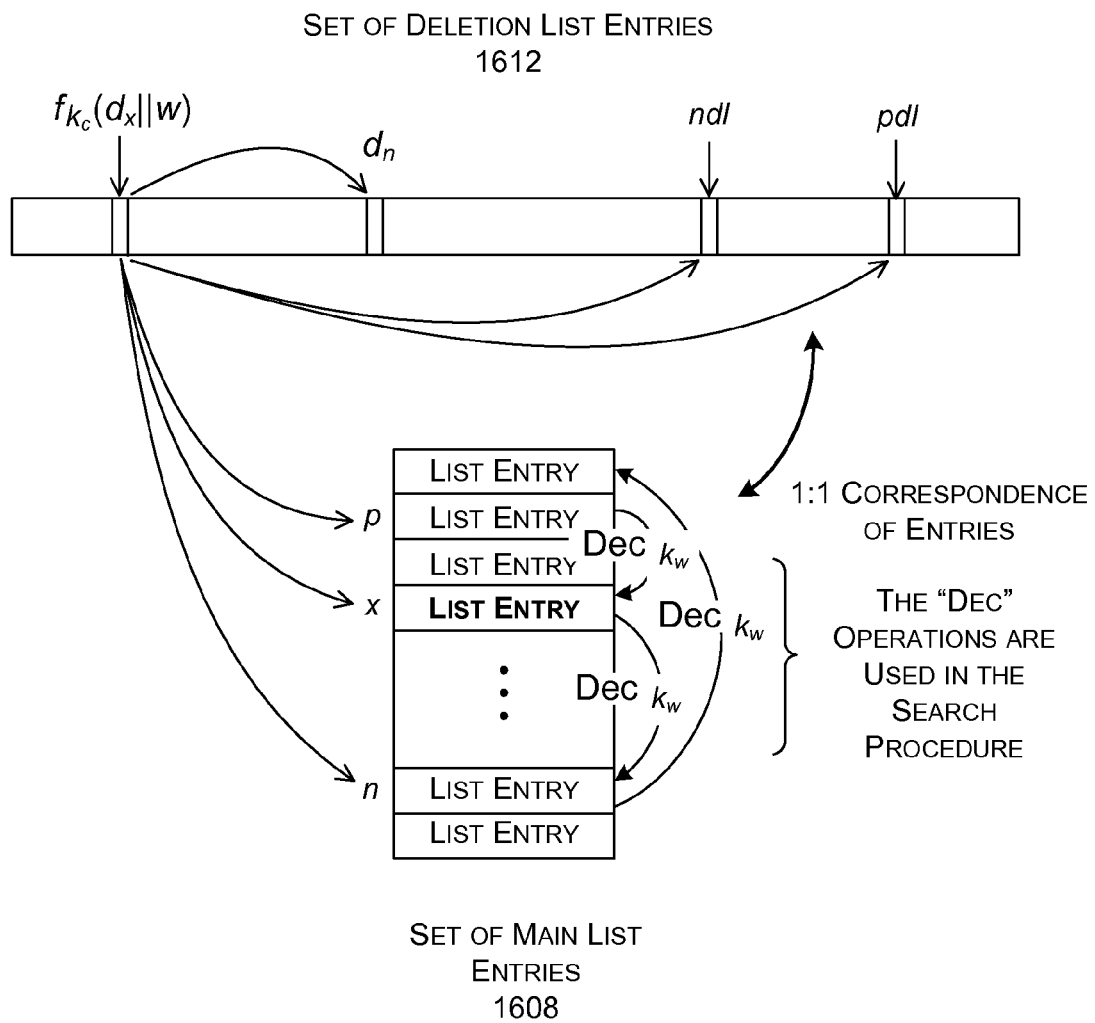
FIG. 17 shows the interaction of a deletion indexing structure and a set of main list entries within the encrypted index information of FIG. 16.

In one implementation, a deletion list entry has the following form: $r_{(1,i)}\|r_{(2,i)}\|r_{(3,i)}\|(d_n\|hdn\|ndl\|pdl) \oplus f_{k_d}(r_{(1,i)}) \| (x\|p\|hp\|n\|hn) \oplus f_{k_d}(r_{(2,i)}) \| f_{k_c}(w_i) \oplus f_{k_d}(r_{(3,i)})$. Here, $d_n$ refers to the location of the next entry in an associated deletion list, and hdn is a Boolean that states whether or not there is such an entry. The value ndl refers to the location of the deletion list entry corresponding to the next position n, and the value pdl refers to the location of the deletion list entry corresponding to the previous position p. In other words, the values ndl and pdl serve the same roles as the tokens $f_{k_c}(d_{i+1}\|w)$ and $f_{k_c}(d_{i-1}\|w)$, respectively, in the word-based implementation. The terms in the fragment $x\|p\|hp\|n\|hn$ have the same meaning as described above with respect to the word-based implementation. FIG. 17 provides an illustration of the relationship between the set of deletion list entries 1612 and the set of main list entries 1608, as described above.

The deletion index 1610 also performs a role that is analogous to the function performed by the main index 1606. Namely, the deletion index 1610 receives a token $f_{k_c}(d)$ that maps to a particular location in the deletion index 1610, associated with the document d. This deletion index entry points to the start of a list associated with the document d, where members in the list correspond to words associated with the document d. The SSE mechanism can then follow the list, using appropriate key information ($k_d$) provided by the token, to process the entries in the list in successive fashion.

The searching modules (310, 406) perform searching in the same manner described above with respect to the per-word implementation. Similarly, the free list management modules (320, 414) can perform free list extension in the same manner described above with respect to the per-word implementation. However, in the per-document implementation, the free list management modules (320, 414) can manage the free list in the main indexing structure 1602 together with the free list entries in the deletion indexing structure 1604 as one integral management operation. This is because, as stated above, there is a one-to-one correspondence between list entries in set of deletion list entries 1512 and list entries in the set of main list entries 1608.

As to the addition operation, the addition module 316 of the client device 102 begins by sending the token $f_{k_c}(d)$ to the deletion index 1610. The addition module 410 of the server 104 adds an appropriate deletion index entry to the location pointed to by this token. This deletion index entry will henceforth point to the beginning of the list for the particular document d. In one implementation, the addition modules (316, 410) then operate to add entries to the encrypted index information 1600 corresponding to respective words that appear in the document d. More specifically, this operation proceeds in the manner described above with respect to the per-word implementation. Namely, for each word, the addition modules (316, 410) re-designate one of the free list entries as a used list entry, perform patching of the main indexing structure 1602, and then perform patching of the deletion indexing structure 1604. To carry out these operations, the client device 102 sends appropriate per-word tokens to the server 104, upon which the server 104 operates on the tokens to perform the individual addition operations. These token transfer and processing operations can be performed successively or at the same time.

As to the deletion operation, the deletion module 318 of the client device 102 begins by again sending the token $f_{k_c}(d)$ to the deletion index 1610, indicating an existing document d to be deleted. The deletion module 412 of the server 104 uses this token to identify the first entry in a list associated with the document d. The deletion modules (318, 412) then cooperate to successively delete entries from the encrypted index information 1600 corresponding to respective words that appear in the document d. This operation proceeds in the manner described above with respect to the per-word implementation. Namely, for each word, the deletion modules (318, 412) re-designate a to-be-deleted list entry as a free list entry, perform patching of the main indexing structure 1602, and then perform patching of the deletion indexing structure 1604. To carry out these operations, the client device 102 need not send per-word tokens to the server 104 (in contrast to the addition operation) because the server 104 already has information regarding the entries that are to be deleted. However, the client-side SSE module 108 will send per-word free list tokens to encrypt the resulting free list entries from the deletion operation.

D. Representative Computer Processing Functionality

FIG. 18 sets forth illustrative computer processing functionality 1800 that can be used to implement any aspect of the functions described above. With reference to FIG. 1, for instance, the type of computer processing functionality 1800 shown in FIG. 18 can be used to implement any aspect of the client-side SSE module 108 of client device 102, and/or any aspect of the server-side SSE module 110 of the server 104. In one case, the computer processing functionality 1800 may correspond to any type of computing device that includes one or more processing devices.

The computer processing functionality 1800 can include volatile and non-volatile memory, such as RAM 1802 and ROM 1804, as well as one or more processing devices 1806. The computer processing functionality 1800 also optionally includes various media devices 1808, such as a hard disk module, an optical disk module, and so forth. The computer processing functionality 1800 can perform various operations identified above when the processing device(s) 1806 executes instructions that are maintained by memory (e.g., RAM 1802, ROM 1804, or elsewhere). More generally, instructions and other information can be stored on any computer readable medium 1810, including, but not limited to, static memory storage devices, magnetic storage devices, optical storage devices, and so on. The term computer readable medium also encompasses plural storage devices.

The computer processing functionality 1800 also includes an input/output module 1812 for receiving various inputs from a user (via input modules 1814), and for providing various outputs to the user (via output modules). One particular output mechanism may include a presentation module 1816 and an associated graphical user interface (GUI) 1818. The computer processing functionality 1800 can also include one or more network interfaces 1820 for exchanging data with other devices via one or more communication conduits 1822. One or more communication buses 1824 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving at least one update-related token that provides update information used to perform an updating operation on encrypted index information;
processing a pool of free list entries of the encrypted index information based on the update information to modify at least one free list entry according to the updating operation; and
modifying a main indexing structure of the encrypted index information based on the update information, the main indexing structure having a set of main list entries corresponding to lists of documents associated with respective words, the encrypted index information including encrypted linking information that identifies positions of the set of main list entries of the main indexing structure, wherein the encrypted linking information has been encrypted using a malleable encryption scheme,
said modifying of the main indexing structure comprising modifying at least one instance of the encrypted linking information that identifies an individual position of a corresponding main list entry in the main indexing structure,
wherein the modifying uses the at least one free list entry and is performed without decrypting said at least one instance of the encrypted linking information that identifies the individual position of the corresponding main list entry,
wherein at least the modifying the main indexing structure is performed by a processing device.

2. The method of claim 1, wherein individual documents have associated sets of searchable words associated therewith.

3. The method of claim 1, wherein the updating operation corresponds to an operation whereby an individual word, associated with an individual document, is added to the encrypted index information or deleted from the encrypted index information.

4. The method of claim 1, wherein the updating operation corresponds to an operation whereby a group of words, associated with an individual document, is added to the encrypted index information or deleted from the encrypted index information.

5. The method of claim 1, wherein the encrypted index information comprises a deletion indexing structure and the encrypted linking information identifies a previous entry for the corresponding main list entry.

6. The method of claim 1, wherein the encrypted index information comprises a deletion indexing structure and the encrypted linking information identifies a next entry for the corresponding main list entry.

7. The method of claim 1, wherein:
the updating operation corresponds to an addition operation,
said processing involves designating the at least one free list entry as a new used main list entry in the main indexing structure, the new used main list entry being associated with a new word-document pair, said modifying of the main indexing structure involves patching the main indexing structure to account for addition of the new used main list entry, and the method further comprises modifying a deletion indexing structure by patching the deletion indexing structure to account for addition of the new used main list entry.

8. The method of claim 1, wherein:

the updating operation corresponds to a deletion operation, said processing involves designating a used main list entry of the main indexing structure as a new free list entry, the used main list entry associated with a deleted word-document pair, said modifying of the main indexing structure involves patching the main indexing structure to account for deletion of the used main list entry, and the method further comprises modifying a deletion indexing structure by patching the deletion indexing structure to account for deletion of the used main list entry.

9. The method of claim 1, further comprising:

receiving at least one free list token; and adding at least one free list entry to the pool of free list entries based on said at least one free list token.

10. The method of claim 1, further comprising:

receiving a search token that provides search information;

identifying an index entry in the main indexing structure based on the search information;

finding a first main list entry in the main indexing structure based on the index entry;

extracting a list of encrypted document identifiers that are linked to the first main list entry, said extracting relying on key information provided by the search information; and sending the list of encrypted document identifiers to a client device.

11. A server comprising:

one or more data stores containing:
    a collection of encrypted documents; and
    encrypted index information that enables access to encrypted document identifiers associated with the encrypted documents, the encrypted index information comprising:
        a main indexing structure having a set of main list entries corresponding to lists of documents associated with respective words; and
        a deletion indexing structure that provides encrypted linking information identifying positions of previous and next entries for individual main list entries in the main indexing structure;

a search module configured to search the collection of encrypted documents based on the encrypted index information; and an update module configured to:
    perform an update operation based on update information provided by at least one update-related token to provide an updated main list entry, and
    modify, by the update operation, an instance of the encrypted linking information in the encrypted index information without decrypting the instance of the encrypted linking information and thereby update corresponding positions of a corresponding previous entry and a corresponding next entry for the updated main list entry; and at least one processing device configured to execute one or more of the search module or the update module.

12. The server of claim 11, wherein the update operation corresponds to an operation whereby an individual word, associated with an individual encrypted document, is added to the encrypted index information or deleted from the encrypted index information.

13. The server of claim 11, wherein the update operation corresponds to an operation whereby a group of words, associated with an individual encrypted document, is added to the encrypted index information or deleted from the encrypted index information.

14. The server of claim 11, wherein the update module includes an addition module configured to perform an addition operation, the addition module comprising:

logic configured to designate at least one free list entry from a pool of free list entries as a new used main list entry, the new used main list entry associated with a new word-document pair;

logic configured to patch the main indexing structure to account for addition of the new used main list entry; and logic configured to patch the deletion indexing structure to account for addition of the new used main list entry.

15. The server of claim 11, wherein the update module includes a deletion module configured to perform a deletion operation, the deletion module comprising:

logic configured to designate at least one used main list entry as a new free list entry in a pool of free list entries, the used main list entry associated with a deleted word-document pair;

logic configured to patch the main indexing structure to account for deletion of the used main list entry; and logic configured to patch the deletion indexing structure to account for deletion of the used main list entry.

16. The server of claim 11, wherein the update module includes a free list management module configured to manage a pool of free list entries, the free list management module comprising:

logic configured to receive at least one free list token; and logic configured to add at least one free list entry to the pool of free list entries based on said at least one free list token.

17. A computer readable memory device or storage device storing data and computer readable instructions, the data and computer readable instructions providing a searchable symmetric encryption module when operated on by one or more processing devices, the data and computer readable instructions comprising:

encrypted index information configured to enable access to document identifiers associated with a collection of encrypted documents, the encrypted index information including encrypted linking information identifying positions of entries in the encrypted index information, wherein the encrypted linking information has been encrypted using a malleable encryption scheme and the entries correspond to lists of the encrypted documents that are associated with respective words; and an update module configured to:

update the encrypted index information in an update operation based on update information provided by at least one update-related token, and modify, by the update operation, at least one instance of the encrypted linking information that identifies an individual position of a corresponding entry in the encrypted index information, wherein the update module is configured to modify the at least one instance of the encrypted linking information without decrypting said at least one instance of the encrypted linking information.

18. The computer readable memory device or storage device of claim 17, wherein the update module is configured to use an exclusive-or operation to modify the at least one instance of the encrypted linking information.

19. The computer readable memory device or storage device of claim 17, wherein the encrypted index information comprises:
- a main indexing structure comprising:
- a set of main list entries corresponding to the lists of the encrypted documents that are associated with the respective words, and
- a main index which maps search information provided in search tokens to associated lists within the set of main list entries; and
- a deletion indexing structure that provides the encrypted linking information, wherein the encrypted linking information identifies previous and next entries for the main list entries.

20. The computer readable memory device or storage device of claim 19, wherein the deletion indexing structure comprises:
- a set of deletion list entries corresponding to lists of words that appear in respective documents in the collection of encrypted documents, there being a one-to-one correspondence between entries in the set of main list entries and entries in the set of deletion list entries; and
- a deletion index which maps document information in document-related tokens to associated lists within the set of deletion list entries.

* * * * *